US011409788B2

(12) United States Patent
Spiry

(10) Patent No.: US 11,409,788 B2
(45) Date of Patent: Aug. 9, 2022

(54) METHOD FOR CLUSTERING AT LEAST TWO TIMESTAMPED PHOTOGRAPHS

(71) Applicant: Comet, Saint Maur des Fosses (FR)

(72) Inventor: Mathieu Spiry, Saint Maur des Fosses (FR)

(73) Assignee: ALBUMS SAS, Aubervilliers (FR)

(*) Notice: Subject to any disclaimer, the term of this patent is extended or adjusted under 35 U.S.C. 154(b) by 185 days.

(21) Appl. No.: 16/561,979

(22) Filed: Sep. 5, 2019

(65) Prior Publication Data

US 2021/0073269 A1 Mar. 11, 2021

(51) Int. Cl.
G06F 16/55 (2019.01)
G06F 16/58 (2019.01)
G06F 16/583 (2019.01)
G06N 20/00 (2019.01)
G06F 16/587 (2019.01)

(52) U.S. Cl.
CPC ............ G06F 16/55 (2019.01); G06F 16/583 (2019.01); G06F 16/587 (2019.01); G06F 16/5866 (2019.01); G06N 20/00 (2019.01)

(58) Field of Classification Search
CPC ....... G06F 16/55; G06F 16/583; G06F 16/587
USPC ......................................................... 707/737
See application file for complete search history.

(56) References Cited

U.S. PATENT DOCUMENTS

| | | | |
|---|---|---|---|
| 9,641,572 B1* | 5/2017 | Yeskel | G06Q 50/01 |
| 10,438,094 B1* | 10/2019 | Ko | G06K 9/6218 |
| 11,070,501 B2* | 7/2021 | Maarek | H04L 51/10 |
| 2008/0133658 A1* | 6/2008 | Pennington | H04L 67/1095 709/204 |
| 2011/0188742 A1* | 8/2011 | Yu | G06K 9/00677 382/159 |
| 2012/0301039 A1* | 11/2012 | Maunder | G06F 16/58 382/225 |
| 2012/0314917 A1* | 12/2012 | Kiyohara | G06F 16/50 382/118 |
| 2014/0376823 A1* | 12/2014 | Cui | G06F 16/5838 382/219 |
| 2017/0093780 A1* | 3/2017 | Lieb | G06T 3/40 |
| 2017/0192965 A1* | 7/2017 | Loscalzo | G06T 11/60 |
| 2019/0095946 A1* | 3/2019 | Azout | G06N 20/00 |
| 2019/0340529 A1* | 11/2019 | Circlaeys | G06F 16/38 |
| 2020/0099639 A1* | 3/2020 | McBeath | G06F 16/51 |
| 2021/0011940 A1* | 1/2021 | Tang | G06F 16/587 |

* cited by examiner

Primary Examiner — Kimberly L Wilson
(74) Attorney, Agent, or Firm — Patshegen IP; Moshe Pinchas

(57) ABSTRACT

A method for clustering groups of photographs, wherein users are each identified by a unique identifier, each user photographs. The method includes capturing photographs; assigning, to each captured photograph, at least one metadata defined by a type, comparing the metadata assigned to each photograph to determine at least one discriminant type, grouping at least two photographs by discriminant type of metadata and clustering the groups if the number of photographs is superior to a first predefined limit value. The method further includes determining a degree of similarity of a cluster of photographs depending on metadata, and defining a common cluster among the users if the degree of similarity is superior to a second predefined limit value.

18 Claims, 19 Drawing Sheets

METHOD FOR CLUSTERING AT LEAST TWO TIMESTAMPED PHOTOGRAPHS

TECHNICAL FIELD OF THE INVENTION

The present invention relates to a method for clustering at least two timestamped photographs.

More specifically, the present invention applies to the field of automatic classification of photographs depending on metadata.

STATE OF THE ART

Portable electronic devices capture photographs, live photographs and videos, which are usually displayed in chronological order.

The user can group them into albums by dragging them by "drag and drop" or by selecting them in packets thanks to adapted selection tools. These albums are then named and filled in by the user through a text field editor. In addition, the user can share his photographs with his friends through messaging and social networks such as Instagram®, Twitter®, Flickr®, Whatsapp® or Face-book®. However, this sharing feature requires the user to sort photographs to share, choose from a list of recipients, or customize share sheets. Other sharing solutions on a remote server, such as iCloud Photo Sharing®, allow automatic sharing of photographs. However, these solutions require the user to define shared albums and rights settings. More recently, the photographs are presented, at the user's choice, exhaustively and chronologically, or in automatic groups. These groups consist of an algorithm, such as that of Photo for iOS®, which selects photographs based on face recognition, chronological proximity of photographs, geolocation of photographs, or recognizable objects in photographs such as dogs, beaches, mountains or flowers. However, these groups that suggest the constitution of albums do not have editorial coherence and thus require an intervention of the user to finalize these albums.

In addition, the number of photographs taken increases dramatically, making it difficult and time consuming to edit, sort, rank, or share, and has a negative effect on the battery life of the portable electronic device.

There is therefore a need for automatic creation of relevant albums for the user not to lose time by organizing photographs.

SUBJECT OF THE INVENTION

The present invention aims to remedy all or part of these drawbacks.

To this end, the present invention envisages a method for clustering at least two groups of photographs, wherein at least two users are each identified by a unique identifier, the unique identifiers of said users being associated in at least one memory, each user having at least two photographs comprising:

for each user:
- a step of capturing at least two photographs;
- a step of assigning, to each captured photograph, at least one metadata defined by a type,
- a step of comparing the metadata assigned to each photograph to determine at least one discriminant type,
- a step of grouping at least two photographs by discriminant type of metadata, a step of comparing the number of photographs in a group to a first predefined limit value, wherein, if the number of photographs in the group is superior to the first predefined limit value, a step of clustering the photographs of the group is performed, then, for at least one user:
- a step of determining a degree of similarity of a cluster of photographs from one of the users to a cluster of photographs from another of the users depending on metadata of photographs within said clusters;
- a step of comparing the degree of similarity to a second predefined limit value; if the degree of similarity is superior to the second predefined limit value, a step of defining a common cluster among the users containing the photographs of said clusters and displaying a message indicating that a common cluster has been defined.

Thanks to these provisions, clusters can be shared between users based on metadata assigned to the photographs of said users.

In some embodiments, during the step of assigning, a timestamp metadata corresponding to the moment the photograph was captured is assigned to at least one photograph, the step of grouping comprising:
- a step of calculating the interval of time between two photographs depending on the assigned timestamps;
- a step of comparing the calculated interval of time to a third predefined limit value; if the calculated interval is inferior to the third predefined limit value, the photographs are grouped.

Thanks to these provisions, the time at which a photograph was taken is taken into account to cluster a user's photographs.

In some embodiments, during the step of assigning, a geolocation metadata corresponding to the location where the photograph was captured is assigned to each captured photograph; the step of grouping further comprising:
- a step of determining a distance between two photographs depending on the assigned geolocations; and
- a step of comparing the distance to a fourth predefined limit value, if the determined distance is inferior to the fourth predefined limit value, the photographs are grouped.

Thanks to these provisions, a cluster can be more precise depending on the location at which each photograph has been captured.

In some embodiments, the method according to the invention further comprises a step of associating a geolocation to a cluster depending on the assigned geolocations of the photograph in the cluster.

The geolocation assigned can then be used to name the cluster, for example.

In some embodiments, the method further comprises a step of defining an origin based on geolocation coordinates and a step of adapting the fourth predefined limit value depending on the distance between the geolocation of a photograph and the origin.

These embodiments make it possible to limit a cluster to a very specific location in an environment known by the user, or to a more general location if the user is far from the defined origin. For example, a cluster concerning a concert close to the user's home can be defined and differentiated from a cluster concerning a diner close to the user's home on the same night, whereas a cluster of a vacation abroad can be defined by the country where the user has traveled without further geographical discrimination.

In some embodiments, the method further comprises, for at least one user, a step of extracting at least one feature representative of a photograph and a step of attributing a metadata to the photograph for at least one extracted feature.

Thanks to these provisions, facial and object recognition algorithms can be applied, and the recognized objects make it possible to identify themes and clusters can be recreated based upon those themes and faces.

In some embodiments, the method further comprises a step of dividing a cluster into at least two sub-clusters depending on metadata attributed to photographs in a cluster and corresponding to an extracted feature.

These embodiments make it possible to create two clusters depending on the content of photographs.

In some embodiments, the method further comprises a step of adapting the third predefined limit value depending on at least one extracted feature representative of a photograph.

These embodiments make it possible to adapt the maximum time elapsed between two photographs depending on the content of the photograph.

In some embodiments, the method further comprises a step of defining a timeframe, a step of comparing the timestamp of photographs in a cluster to the defined timeframe and a step of chaining clusters depending on metadata attributed to photographs in a cluster if the timestamp of all of the photographs in a cluster are within the defined timeframe.

Thanks to these provisions, the timeframe can correspond to an event registered in a user's agenda, the cluster automatically being defined by the event.

In some embodiments, the method further comprises, for at least one user, a step of importing an event characterized by event metadata, a step of associating an event to at least one cluster or sub-cluster depending on metadata of photographs in said cluster or sub-cluster and on the event metadata.

Thanks to these provisions, the cluster can be defined or named based on the associated event.

In some embodiments, an event metadata comprises a geolocation and a timeframe, the method comprising a step of excluding said photograph from a cluster associated with an event if the geolocation and timestamp of the photograph fail to correspond to the geolocation and timeframe of the event metadata.

These provisions make it possible to associate albums, or clusters, to very precise events.

In some embodiments, the method further comprises, for at least one user, a step of applying a machine learning algorithm configured to modify at least one predefined limit value, the machine learning algorithm being applied to at least one parameter representative of a user habit in relation to said predefined limit value.

Thanks to these provisions, the predefined limit values are more precisely defined.

In some embodiments, the method further comprises, for at least one user, a step of reallotting at least one photograph from one cluster to another.

These provisions make it possible to modify the clusters depending on more precise clustering methods.

In some embodiments, the step of defining a common cluster comprises a step of sharing said common cluster between the uses after validation by at least one user.

Thanks to these provisions, upon user consent, the sharing of clusters can be suggested and not performed automatically.

In some embodiments, the method further comprises a step of displaying at one common cluster in the form of a graph depending on the metadata of the photographs in the common cluster and on the identified users sharing said common cluster.

These embodiments make it possible to represent graphically the users sharing at least one cluster of photographs.

In some embodiments, the method further comprising, for at least one user, a step of automatically naming at least one folder depending on metadata of the photographs in a cluster and a step of displaying the folders containing the photographs of the corresponding cluster.

Thanks to these provisions, different users can have access to photographs of the same event.

In some embodiments, wherein each unique identifier comprises user metadata, one user having a cluster of photographs, the method further comprising a step of comparing user metadata representing another user to the photograph metadata within said cluster and, depending on the results of the comparison, a step of associating the another user to said cluster.

These embodiments make it possible to invite a user, that may not have captured any photographs, to share a cluster.

In some embodiments, for at least one user, the step of grouping is iterated when at least one additional photograph has been captured.

These embodiments make it possible to refine the clusters defined for at least one user.

BRIEF DESCRIPTION OF THE FIGURES

Other advantages, aims and particular features of the invention will become apparent from the non-limiting description that follows of at least one particular embodiment of the method subject of the present invention, with reference to drawings included in an appendix, wherein.

DESCRIPTION OF EXAMPLES OF REALIZATION OF THE INVENTION

The present description is given in a non-limiting way, each characteristic of an embodiment being able to be combined with any other characteristic of any other embodiment in an advantageous way. In addition, each parameter of an example of realization can be utilized independently from the other parameters of said example of realization.

It should be noted that the figures are not to scale.

It is noted that the present description contains three parts corresponding to three methods subject of the present invention which can be combined.

Method for Clustering

Figure 32:
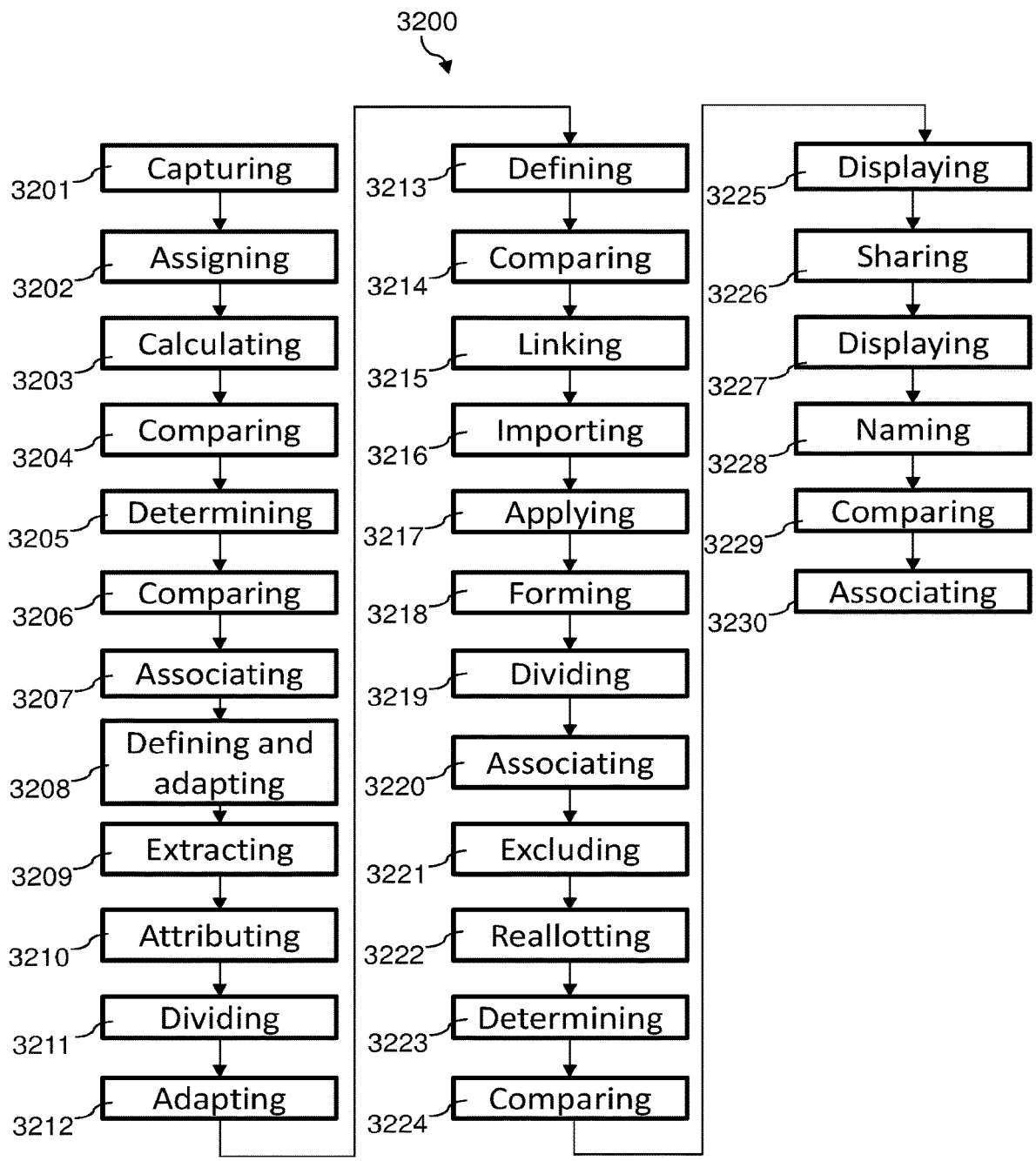
FIG. 32 represents, as a succession of steps, a sixth particular embodiment of the method for clustering subject of the present invention.

FIGS. 1 to 11 represent embodiments of a method for clustering subject of the present invention, of which a detailed embodiment is represented in FIG. 32. The method for clustering at least two groups of photographs, wherein at least two users are each identified by a unique identifier, the unique identifiers of said users being associated in at least one memory, each user having at least two photographs comprising:

for each user:
step of capturing 3201 at least two photographs;
a step of assigning 3202, to each captured photograph, at least one metadata defined by a type,
a step of comparing the metadata assigned to each photograph to determine at least one discriminant type,
a step of grouping at least two photographs by discriminant type of metadata, a step of comparing 3204 the number of photographs in a group to a first predefined limit value, wherein, if the number of photographs in the group is superior to the first predefined limit value, a step of clustering 3218 the photographs of the group is performed, then, for at least one user:
a step of determining 3223 a degree of similarity of a cluster of photographs from one of the users to a cluster of photographs from another of the users depending on metadata of photographs within said clusters;
a step of comparing 3224 the degree of similarity to a second predefined limit value;
if the degree of similarity is superior to the second predefined limit value, a step of defining 3226 a common cluster among the users containing the photographs of said clusters and displaying a message indicating that a common cluster has been defined.

A discriminating type of metadata is a type of metadata creating clear boundaries between groups of photographs.

Figure 1:
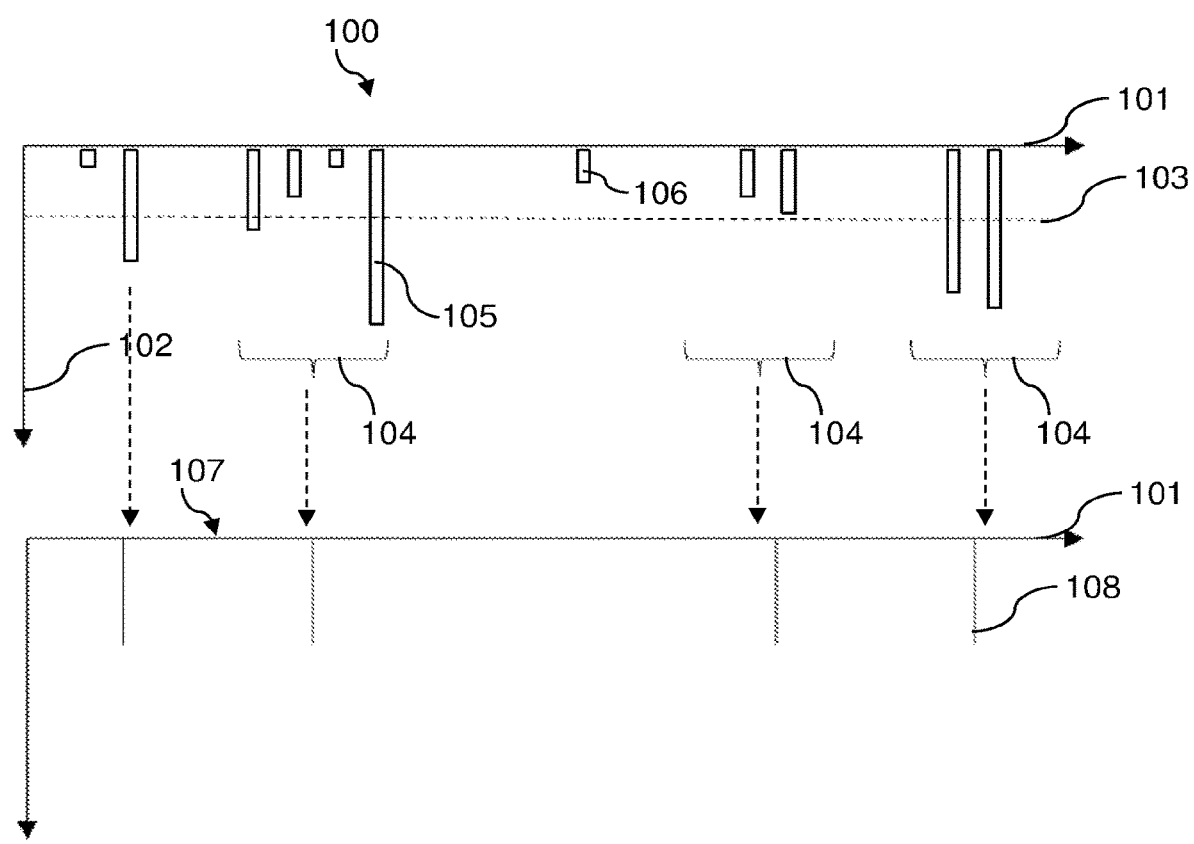
FIG. 1 represents, schematically, a first particular embodiment of the method for clustering subject of the present invention.

FIG. 1 represents a first embodiment of a method for clustering. FIG. 1 is described accordingly to steps depicted on the flow chart of FIG. 32.

In FIG. 1, two graphs are represented one on top of the other. The first graph 100 represents a number of photographs, axis 102, taken over time, axis 101.

The photographs were captured during a step of capturing 3201 a photograph, in which at least two photographs were captured. The step of capturing 3201 a photograph is performed on a device containing a camera, a memory for recording the captured photograph and a clock, such as a digital camera, a mobile device, a smartphone, a tablet, for example. The step of capturing 3201 a photograph is well known to one skilled in the art.

After the step of capturing 3201, a step of assigning 3202 to each captured photograph a timestamp metadata corresponding to the moment the photograph was captured is performed. The timestamp can be obtained by the clock of the device used to capture the photograph. The step of assigning 3202 is well known to one skilled in the art.

In some embodiments, the photograph capturing device comprises computing means for establishing metadata assigned with each photograph captured, such as computer vision means for visual content, intelligent vision, object detection, object recognition and sentiment analysis, and management means of a social network.

The metadata that can additionally be assigned is, for example:
a geolocation;
a technical notation of photographs for example depending on blurring, contrast, and/or luminance;
a tailored ranking;
at least one recognized object and/or face
at least one expression of a faces, an attitude or an age;
a social popularity depending on a social network;

a determined atmosphere of light, color and/or context such as indoor or outdoor, children or adults, solitary or group of people, sea or mountain, scenery and so on.

These metadata are known and described in part in the U.S. Pat. No. 9,858,295 hereby incorporated by reference.

As the photographs in the memory are timestamped the number of photographs taken over time can be determined and graphically organized such as represented in the top graph of FIG. 1.

The time interval 104 represents a third predefined value.

A step of calculating 3203 the interval of time between two photographs depending on the assigned timestamps is applied to the photographs stored. The step of calculating the interval of time subtracts the oldest timestamp from the newest.

A step of comparing 3204 the calculated interval of time to a third predefined limit value, if the calculated interval is inferior to the third predefined limit value, the photographs are grouped as depicted in bars, 105 and 106, on the first graph of FIG. 1. Several bars can be within the same third predefined limit value and can be grouped as depicted in FIG. 1.

The dotted line 103 represents a first predefined limit value.

During a step of comparing 3204, the number of photographs in a group is compared to the first predefined limit value 103; if the number of photographs in the group is superior to the first predefined limit value 103, a cluster comprising the photographs of the group is formed 3218.

The cluster is represented in FIG. 1 on the second graph 107 of FIG. 1, below the first graph in which clusters are represented over time. The clusters 108 are represented by bars showing a cluster was formed. Each bar corresponds to a cluster, the absence of bars corresponds to an absence of clusters, in an all-or-nothing manner.

In FIG. 1, four clusters were formed, the clusters are described hereafter from left to right. The first cluster comprises photographs taken roughly at the same time in an amount superior to the first predefined limit value 103. The second cluster comprises three groups of photographs, taken at three different times within the time interval of the third predefined limit value 104, two 105 out of the three groups taken into account have a number of photographs superior to the first predefined limit value 103. The third cluster comprises two groups of photographs taken at two different times within the time interval of the third predefined limit value 104, both groups taken into account have a number of photographs individually inferior to the first predefined limit value 103, the sum of the number of photographs in the two group being superior to the first predefined limit value 103. The fourth cluster comprises two groups of photographs taken at two different times within the time interval of the third predefined limit value superior to the first predefined limit value 103.

The third 104 and first 103 predefined limit value can be preset by a user or can be modified manually or automatically.

Figure 2:
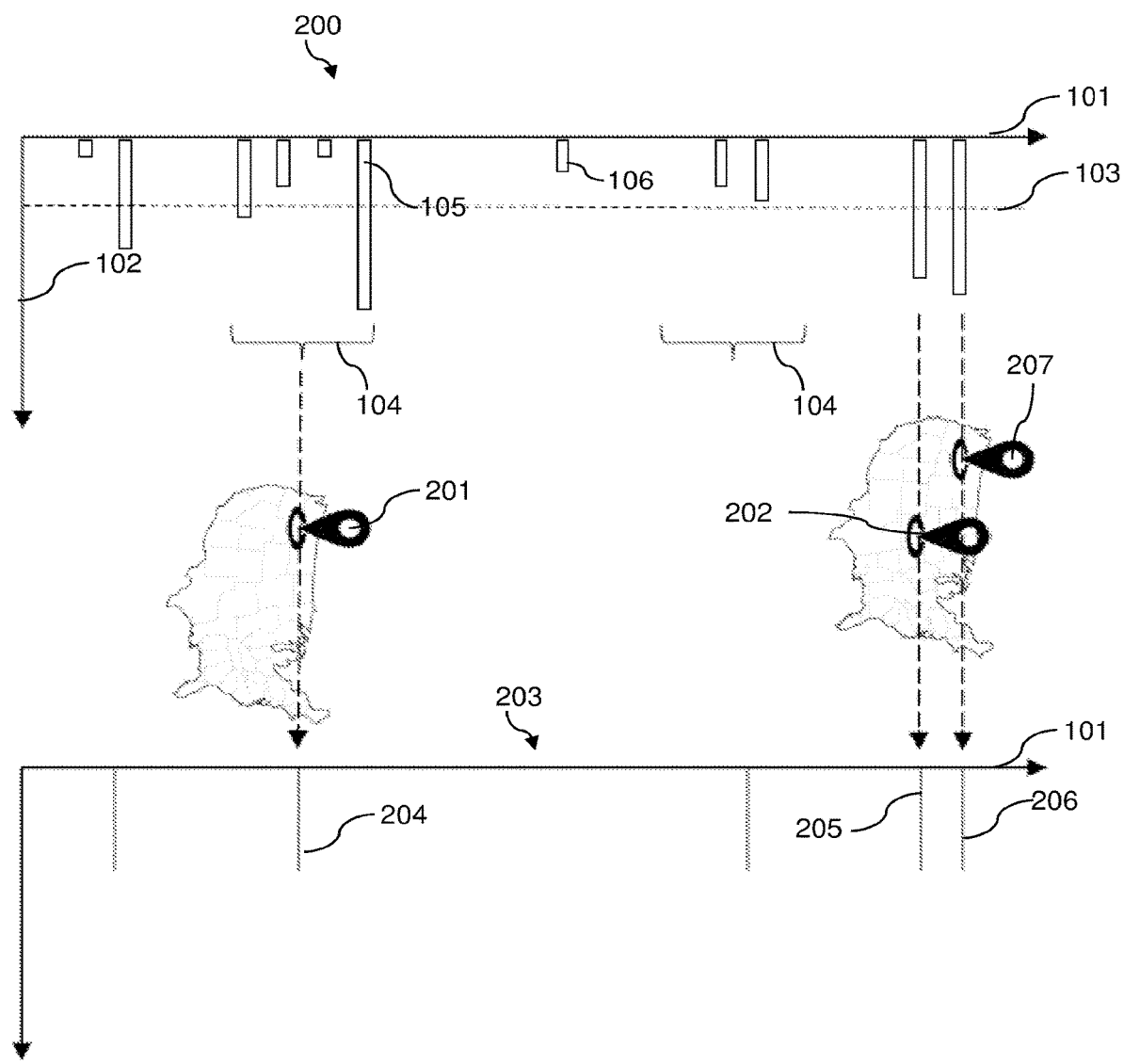
FIG. 2 represents, schematically, a second particular embodiment of the method for clustering subject of the present invention.

FIG. 2 represents a second embodiment of the method for clustering subject of the present invention.

In FIG. 2, during the step of assigning 3202, a geolocation metadata, 201, 202 and 207, corresponding to the location where the photograph was captured is assigned to each captured photograph; the method further comprising:

a step of determining 3205 a distance between two photographs depending on the assigned geolocations, 201, 202 and 207; and a step of comparing 3206 the distance to a fourth predefined limit value, if the determined distance is inferior to the fourth predefined limit value, the photographs are grouped.

During the step of determining 3205, the distance is calculated based on geolocation coordinates as is well known by one skilled in the art. The fourth predefined limit value is a distance.

Similarly to FIG. 1, FIG. 2 shows two graphs with the same axes 101 and 102, the top graph 200 shows a number of photographs taken over time and the bottom graph 203 represents clusters over time. In between the top 200 and bottom 203 graphs, are two representations of geolocations, 201, 202 and 207, at which photographs were taken.

In the left representation, all the photographs were taken at least one location 201 whereas, in the right representation, the photographs were taken at two different locations, 202 and 207.

The clusters of the bottom graph 203 are hereafter described from left to right. The first and third clusters are similar to those of FIG. 1. The second cluster 204 is also similar to the second cluster of FIG. 1 since the photographs were taken in the same location 201. The fourth cluster 205 comprises a first group of photographs superior to the first predefined 103 limit value taken at a first location 202, at the same time. The fifth cluster 206 comprises a second group of photographs superior to the first predefined limit value 103 taken at a second location 207, at the same time. The first and second groups of photographs are taken at two different times within the time interval of the third predefined limit value 104, however since the locations, 202 and 207 of the photographs differ, two different clusters are formed.

In some embodiments, the method 3200 comprises a step of associating 3207 a geolocation to a cluster depending on the assigned geolocations of the photograph in the cluster. The geolocation associated to a cluster is for example the most common geolocation of photographs within said cluster. The association can be a metadata of a cluster and/or a name of a folder containing the photographs of the cluster, for example.

In preferred embodiments, the method comprises a step of defining 3208 an origin based on geolocation coordinates and a step of adapting 3208 the fourth predefined limit value depending on the distance between the geolocation of a photograph and the origin. The origin can be defined automatically where most pictures are geolocated or the origin can be defined by the user. During the step of adapting, the fourth predefined limit value can be proportional to the distance between the geolocation of a photograph and the origin. For example, when the user has taken pictures at two different locations close to the origin, the geolocations are considered different. Whereas, is the user in a different country, the geolocations are considered similar with regards to the formation of a cluster.

Figure 3:
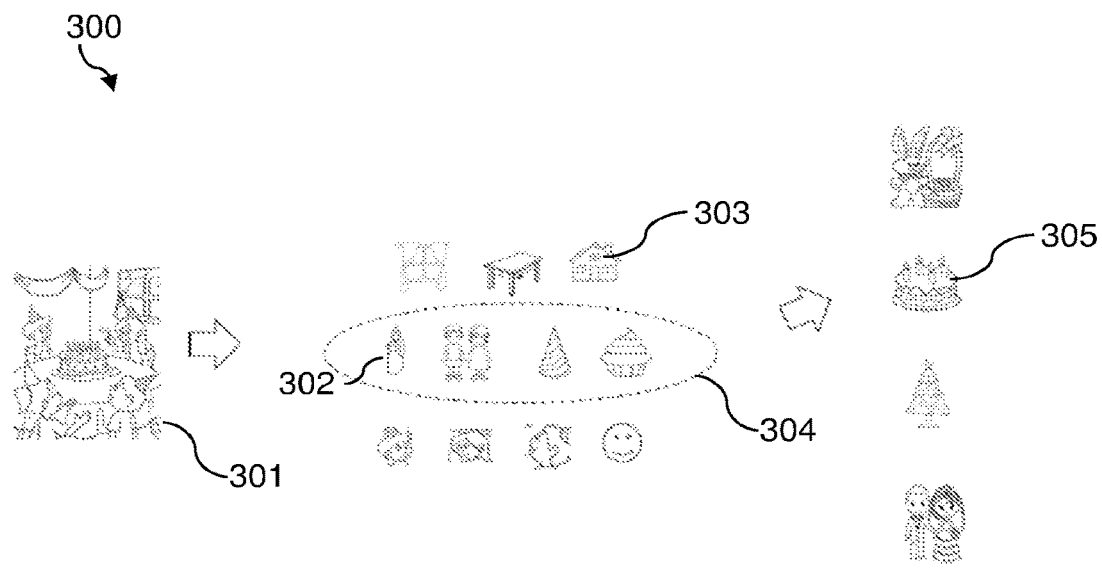
FIG. 3 represents, schematically, an extraction of metadata from a photograph used in a method subject of the invention.

FIG. 3 represents an example 300 of feature extraction from a photograph 301.

In preferred embodiments, the method 3200 comprises a step of extracting 3209 at least one feature representative of a photograph 301 and a step of attributing 3210 a metadata 302, 303 and/or 305, to the photograph for at least one extracted feature 302 or 303.

The step of extracting 3209 is known to one skilled in the art as intelligent vision and/or object detection applications which create photograph metadata with detected objects or context information. In the example of FIG. 3, the objects, 302 and 303, are: window, table, interior, candle, child, hat, cake, Jim, Anna, Ron, Steve, smile. The metadata attributed during step 3210 can be a list of these objects, 302 or 303, or a group of objects 304.

In some embodiments, the computing means have access, locally or remotely, to a database connecting extracted objects to themes and a search engine to navigate said database. The metadata attributed comprises the list of objects extracted and/or a theme derived from the database connecting object to themes.

The database contains a list of themes such as Easter, birthday, Christmas, wedding. At the birthday theme are associated the objects gift, garland, candle, child, pointed hat, cake. The search engine identifies the common objects such as candle, child, pointed hat, cake between the photograph and the theme "Birthday" which is selected to characterize the photograph, as it is more likely than the other themes. In FIG. 3, the theme 305 identified is "Birthday".

Such a database is known to one skilled in the art and for example described in U.S. Pat. No. 9,378,202 hereby incorporated by reference.

Figure 4:
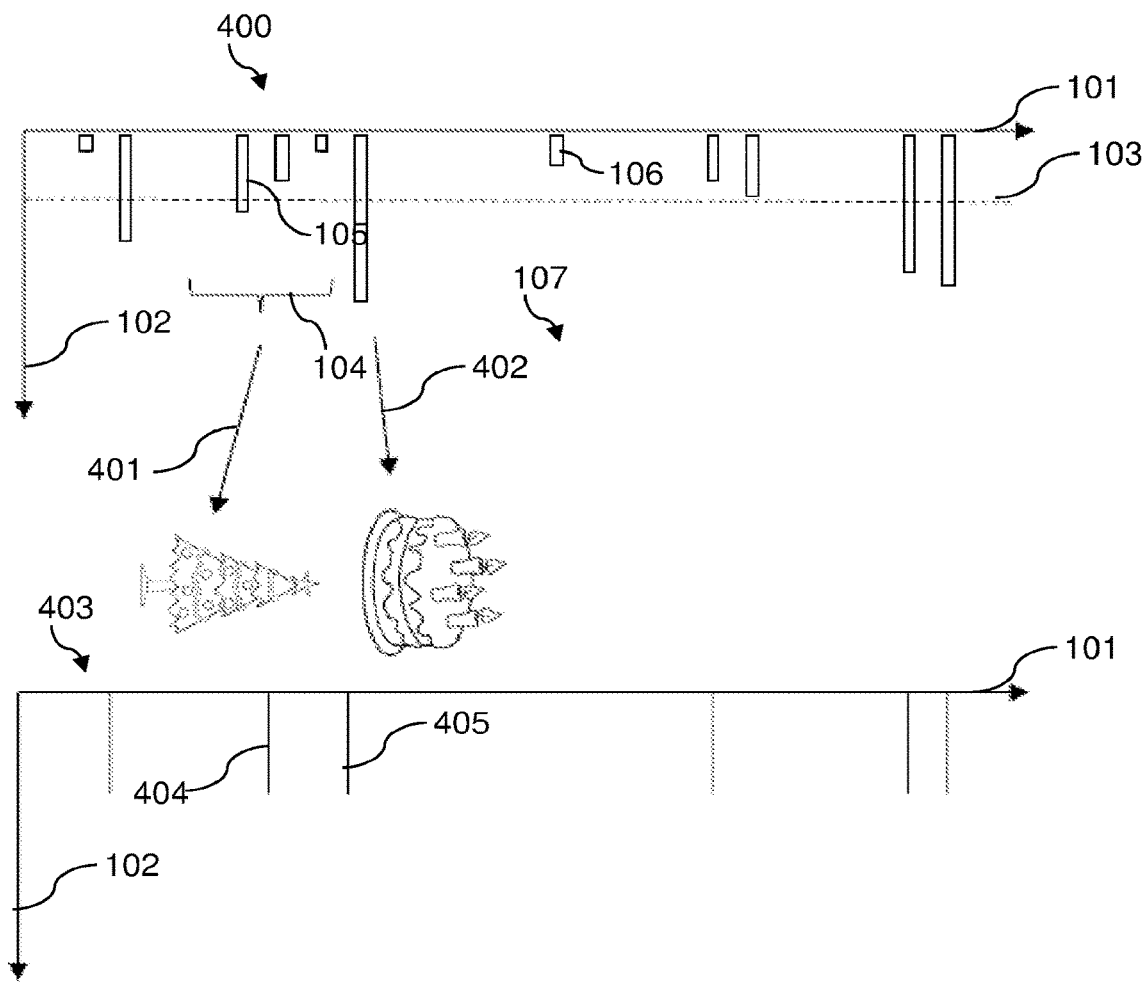
FIG. 4 represents, schematically, a third particular embodiment of the method for clustering subject of the present invention.

FIG. 4 represents a third embodiment of the method for clustering subject of the present invention.

In some embodiments, the method 3200 comprises a step of dividing 3211 a cluster 204 into at least two sub-clusters 404 and 405 depending on metadata attributed to photographs in a cluster and corresponding to an extracted feature.

Similarly to FIG. 1, FIG. 4 shows two graphs with the same axes, 101 and 102, the top graph 400 shows a number of photographs taken over time and the bottom graph 403 represents clusters over time. In between the top 400 and bottom 403 graphs, are two representations, 401 and 402, of themes attributed to a group of photographs.

In the representation 401, all the photographs were taken with the theme "Christmas" in common, whereas, in the representation 402, the photographs were taken with the theme "Birthday" in common.

The clusters of the bottom graph 403 are hereafter described from left to right. The first cluster is similar to that of FIG. 1, the fourth, fifth and sixth clusters are similar to the third, fourth and fifth clusters of FIG. 2, respectively. The second cluster 404 comprises three groups of photographs, the number of which is independently inferior to the first predefined limit value 103 for two groups out of three, but the time interval between the three groups is inferior to the third predefined limit value 104 and the theme is common to all of the groups. The third cluster 405 comprises a group of photographs superior to the first predefined limit value 103 and taken at the same time. The groups of photographs of the second and third clusters are all taken at two different times within the time interval of the third predefined limit value 104, however since the themes of the photographs differ, the clusters formed are different.

In particular embodiments, the method 3200 comprises a step of adapting 3212 the third predefined limit value 104 depending on at least one extracted feature representative of a photograph. For example, the third predefined limit value 104 depends on the theme. Indeed, when the user is traveling, his shots are less frequent than during a birthday. The step of adapting 3212 is performed by computing means.

In particular embodiments, the method comprises a step of importing 3216 an event characterized by event metadata, a step of associating 3220 an event to at least one cluster or sub-cluster depending on metadata of photographs in said cluster or sub-cluster and on the event metadata.

The step of importing 3216 can be performed by the computing means. The event and event metadata can be stored locally or on a remote server, the remote server can be a server of a social network for example.

Event metadata is, for example, at least one of:
- a timestamp or timeframe such as "Anniversary of Anna: December 20th";
- a geolocation such as "Disneyland: Anaheim";
- a face, such as "Roland Garros: Federer, Nadal";
- at least one object, such as Rolling Stones Concert: guitar, drums"; and/or
- a division 3219 into sub-events, for example for a series of matches organized in stadiums or on different courses such as Football World Cup: final, semifinal, quarterfinal.

During the step of associating 3220, each event is processed like a theme, a search engine links photographs and events by comparing metadata of the photographs of the cluster and of the event. Themes and events are not exclusive, for example "Anniversary of Anna at Disneyland" or "Easter holidays" are combinations.

In particular embodiments, an event is an additional criterion of segmentation of clusters. An event metadata comprises a geolocation and a timeframe, the method 3200 comprising a step of excluding 3221 at least one photograph from a cluster associated with an event if the geolocation and timestamp of the photograph fail to correspond to the geolocation and timeframe of the event metadata.

The photograph can be reallotted to another cluster or not be part of a cluster once excluded.

The first and second and third predefined limit value can be preset by a user or can be modified manually or automatically.

In some embodiments, the method comprises a step of applying 3217 a machine learning algorithm configured to modify at least one predefined limit value, the machine learning algorithm being applied to at least one parameter representative of a user habit in relation to said predefined limit value.

In the previous embodiments, clusters have been formed according to an ordered sequence of criteria:
- timestamp;
- delay between photographs;
- geolocation;
- identified themes;
- identified events;

Iterations of this sequence are necessary. As explained above, the third predefined limit value 104 can depend on a theme and the fourth predefined limit value can depend on a distance from an origin.

In some embodiments, the method comprises a chaining step to create links between separate clusters, based on a common theme. For example, a succession of Christmas events such as Tree Lightning Ceremony, shopping, Christmas Eve, Christmas Day can be used to chain clusters. Themes and events are associated with predefined chaining rules, stored in a database for example. The theme of Christmas is accompanied by the rule of chaining clusters on the same theme, from November to December.

In some embodiments, the method 3200 comprising a step of defining 3213 a timeframe and a step of comparing 3214 the timestamp of photographs in a cluster to the defined timeframe a step of chaining 3215 clusters depending on metadata attributed to photographs in a cluster if the timestamp of all of the photographs in a cluster are within the defined timeframe. These steps defined a step named "cut-off". Clusters can then be cut according to predefined rules associated with themes and events. At the event "Roland Garros" is associated with a precise geolocation time-out rule indicating the number of the tennis course, for example. If a photograph is not taken at the location or within the timeframe, it is excluded from the cluster.

In some embodiments, the method comprises a step of applying 3217 a machine learning algorithm configured to modify at least one predefined limit value, the machine learning algorithm being applied to at least one parameter representative of a user habit in relation to said predefined limit value.

The predefined limit value can be initially predefined arbitrarily and later modified according to the habits of the user, for example:
- the third predefined limit value is reduced if the daily frequency of taking pictures is high
- the first predefined limit value is increased if the user merges close clusters,
- the fourth predefined limit value is increased if the user travels frequently abroad or if the average distance from home and workplace is important.

These predefined limit values then make it possible to parameterize known techniques of clustering such as a method of grouping photographs by date taught by Ward, Paul AS et al. "Clustering strategies for cluster timestamps." International Conference on Parallel Processing, 2004. ICPP 2004. There are multiple implementation algorithms such as K-means or OPTICS. Or a method of clustering by date and geolocation is taught by Fuji Xerox in US Patent Application US 2013/0,022,282 hereby incorporated by reference.

In such embodiments, the criteria for defined clusters are extensible
- to face recognition, for defining the cluster "Anna's college years";
- to the recognition of objects, for defining for example the cluster "Winter sports" after the objects «ski» «Mountain» «people» «coat» «backpack» «cap» and a semantic analysis via machine learning models;
- to the recognition of feelings such as smile, attitude, to define the cluster «Happiness moment» after features extracted from the face (shape of eyes, lips, . . . ) and models of machine learning;
- to a technical note of the photographs, to define the cluster «most beautiful» photographs.
- a combination several criteria to define the cluster "most beautiful football pictures"
- a division of clusters into sub-clusters into sub-clusters.

Methods of presentation of photographs by a tree of albums and under albums is taught in U.S. Pat. No. 9,471, 200 hereby incorporated by reference. In particular embodiments, the boundaries of a cluster define a sub-hyper-space to which is applied the same clustering algorithm that identified a cluster.

Figure 5:
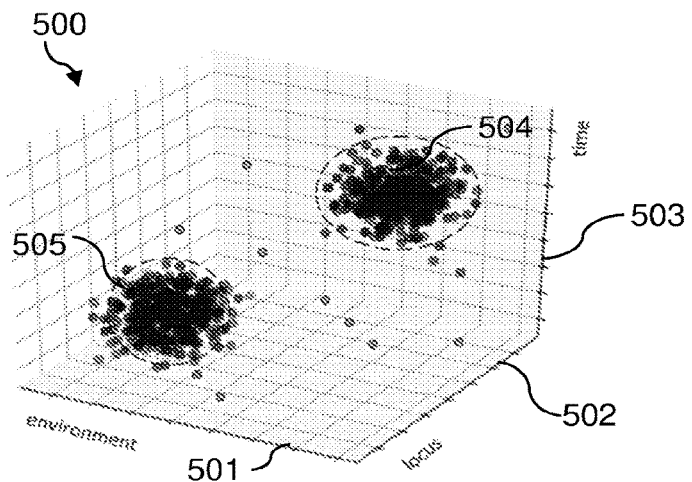
FIG. 5 represents, schematically, photographs in clusters.

FIG. 5 represents clusters of photographs in a three-dimensional space 500. FIG. 5 represents two clusters, 504 and 505, clearly identified and photographs in neither cluster. The photographs are represented in a three-dimensional graph, the dimensions 501, 502 and 503 correspond respectively to an environment, a focus and a timestamp.

FIGS. 1, 2 and 4 show how to cluster the photos according to successive criteria: temporal, geographical, thematic. FIG. 5 illustrates how to create clusters by applying several criteria simultaneously. This is the very principle of clustering: groupings are made according to the distance, in the sense of least squares, between the photos classified in a mathematical space whose dimensions are these criteria. However, such clustering is not sufficient to group the photos, because it does not allow for example steps of chaining, exclusions or iterations as is possible in the method for clustering subject of the present invention.

In some embodiments, the method 3200 comprises a step of reallotting 3222 at least one photograph from one cluster to another.

In this embodiment, the first, second and third predefined limit values and the theme are not ordered criteria, but form as many dimensions of a hyper-space in which the photographs are grouped by cluster, according to techniques of clustering known for large spaces like the HDBSCAN algorithm. This evolution of DBSCAN, described by Campello RJGB, Moulavi D., Sander J. (2013) in Density-Based Clustering Based on Hierarchical Density Estimates, makes it possible to extract clusters as a function of a distance, epsilon. This variable is adjusted independently of each group when running the algorithm. This technique allows a more flexible approach than DBSCAN for group detection by adapting this distance to distinguish groups. During the reallotting step the photographs in clusters are reallotted with predefined consolidation rules and based on applying the above-mentioned steps of iteration, chaining, clustering and cutoff, to a new set of photographs.

Figure 6:
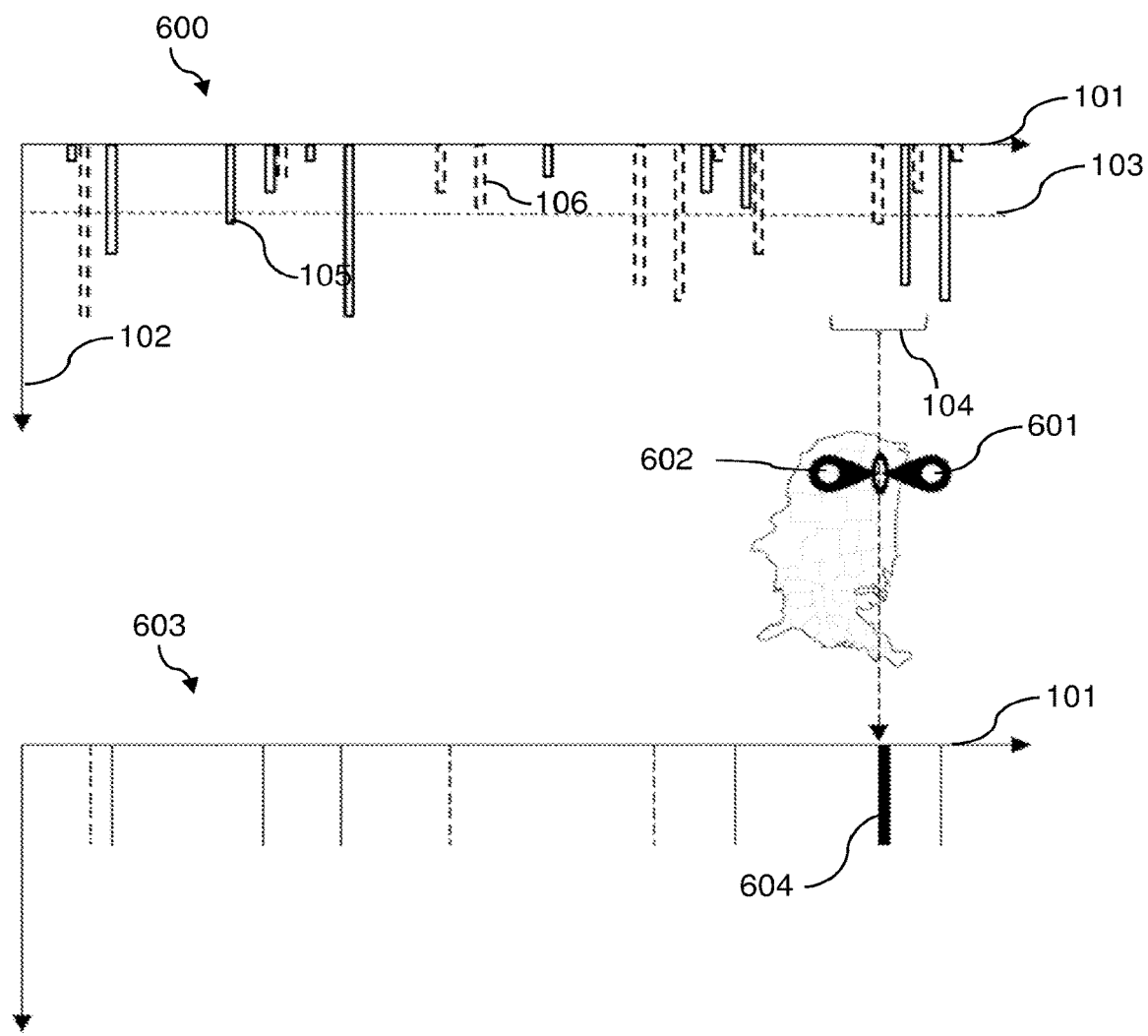
FIG. 6 represents, schematically, a fourth particular embodiment of the method for clustering subject of the present invention.

FIG. 6 represents a fourth embodiment of the method for clustering according to the present invention.

In FIG. 6, at least two users are each identified by a unique identifier, the unique identifiers of said users being associated in at least one memory. Unique identifier of users is well known to one skilled in the art, more particularly regarding social networks.

Similarly to FIGS. 1, 2 and 4, FIG. 6 shows two graphs with the same axes 101 and 102, the top graph 600 shows a number of photographs taken over time and the bottom graph 603 represents clusters over time. In between the top 600 and bottom 603 graphs, is a representation, 601 and 602, of geolocation metadata of photographs. The photographs represented in graph 600 are taken by two distinct users, the photographs taken by one user are represented by dotted bars, the photographs taken by the user are represented by full lined bars. Similarly, the clusters corresponding to the dotted bars of one user are represented by dotted lines, the clusters corresponding to the full lined bars are represented by full lines.

The method 3200 comprises:
a step of determining 3223 a degree of similarity of a cluster of photographs from one of the associated users to a cluster of photographs from another of the associated users depending on metadata of photographs within said clusters;
a step of comparing 3224 the degree of similarity to a first predefined limit value; if the degree of similarity is superior to the first predefined limit value, a step of defining a common cluster among the users containing the photographs of said clusters and displaying a message indicating that a common cluster has been defined.

During the step of determining 3223, the degree of similarity depends on the number of common metadata between groups of photographs of the users. The degree of similarity increases with the number of similar metadata between a group of photographs of a first user and a group of photographs of a second user.

The first predefined limit value can be set by a user or automatically calculated and modified based on user behavior. In preferred embodiments, the first predefined limit value corresponds to a degree of similarity in which:
- the theme of a cluster for each user is identical;
- the geolocation of a cluster for each user is identical; and/or
- both users are linked on a social network.

In FIG. 6, a common cluster 604 is defined for the users when the degree of similarity is superior to the first predefined limit value. The users are then solicited to share the common cluster 604.

Figure 7:
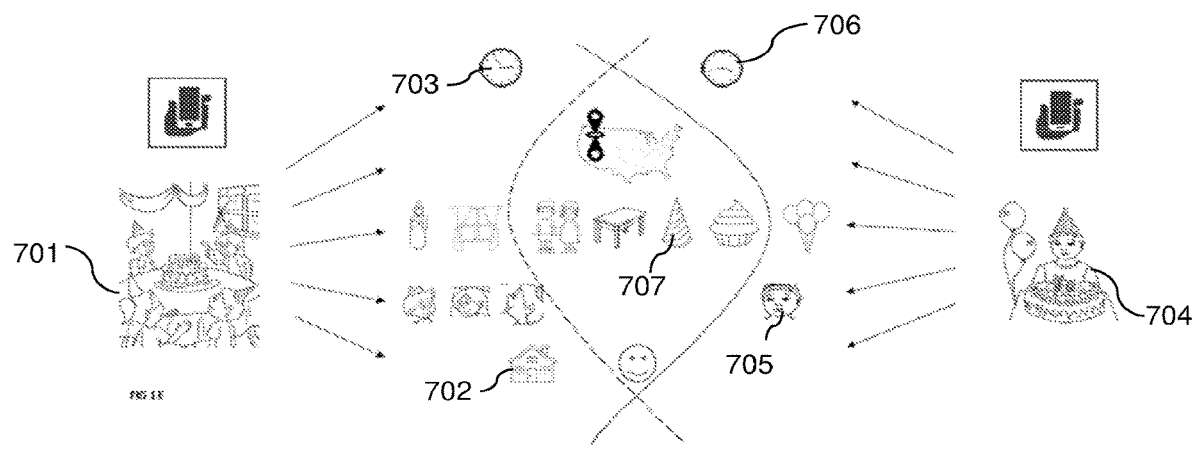
FIG. 7 represents, schematically, a grouping of metadata extracted from two pictures used in a method subject of the invention.

With reference to FIG. 7, the strict identity of two criteria of clusters, such as a theme, a geolocation or a timestamp, is often uncertain. Two clusters of users linked on a social network reveal, for example, non-determining similarities such as:

the cluster 701 of the first user is characterized by:
- a time slot 703 around 3:00 pm;
- a geolocation at a precise postal address, which corresponds to a ten-story building;
- identified objects 702 and 707: candle, window, children, table, pointed hat, cake;
- identified faces 702: Jim, Anna, Ron;
- identified atmosphere 702 and 707: indoor, smile;

the cluster 704 of the second user is characterized by:
- a time slot 706 around 3:45 pm;
- a geolocation at the same postal address;
- identified objects 705: children, table, pointed hat, cake, balloon;
- identified faces, 705 and 707: Steve;
- identified atmosphere, 705 and 707: smile.

Therefore, as explained with regards to FIG. 6, the identity is defined according to similarities, i.e. probability thresholds or by known clustering techniques. Preferably, the common cluster 604 is associated with a probability rate of this common character, which rates the degree of similarity.

An example of degrees of similarity is represented in the following table:

The percentage in the column "common with" represents the degree of probability.

Preferably, after the step of comparing 3224, an intermediate database which, on the basis of a set of photographs, is segmented into common clusters 604 and individual clusters is created.

In preferred embodiments, the step of defining a common cluster comprises a step of sharing said common cluster between the uses after validation by at least one user.

Figure 8:
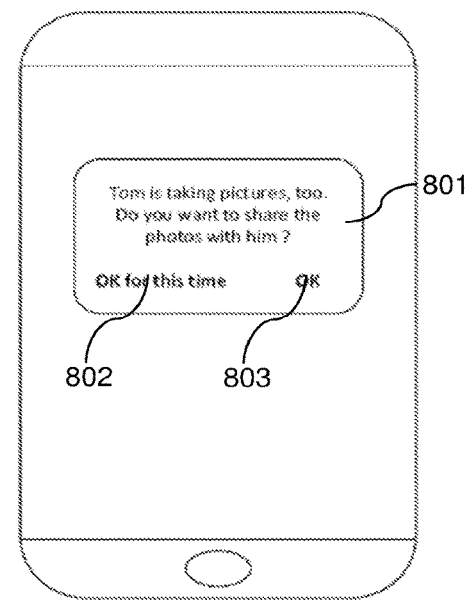
FIG. 8 represents, schematically, an interaction between users in a method subject of the invention.

FIG. 8 represents an example of a step for displaying 3225 a message indicating that a common cluster has been defined. The message is displayed on a screen of a device of at least one user for which a common cluster 604 has been identified. The message can display 3225 a suggestion of sharing between the users the common cluster among said users.

By validation, for example after clicking on the button 803 "OK" by one of the users, a common cluster 604 temporarily stored in the intermediate database turns the common cluster 604 into a "shared cluster" 903 at step 3226 if the other user validates the sharing.

FIG. 8 represents two acceptance buttons, 802 and 803: a temporary acceptance button 802 and a permanent acceptance button 803. The temporary acceptance button 802 allows the user to share the cluster for a predefined time and/or for a unique cluster. The permanent acceptance button 803 is indefinite and for all common clusters 604.

Sharing a cluster enriches the cluster of each user with the photographs of the other user in the corresponding cluster. The photographs of the cluster are indicated with the corresponding pictograms "shared with" or "shared by" according to the author, for example.

Figure 9:
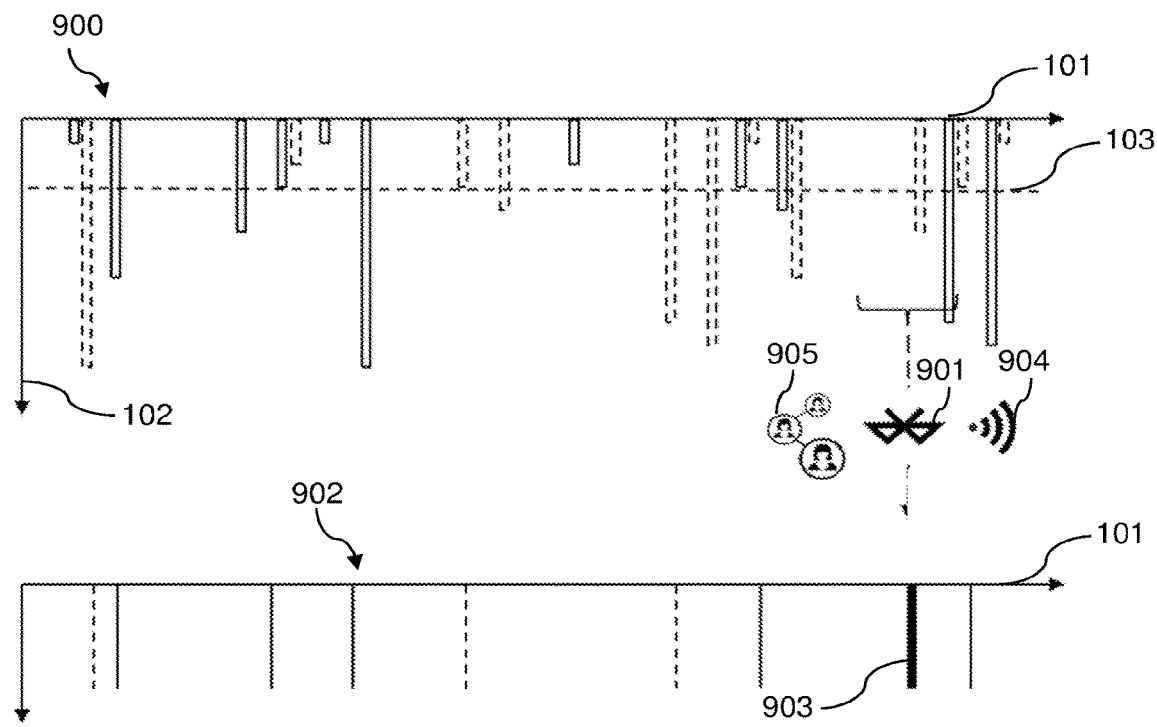
FIG. 9 represents, schematically, a step of sharing of the method for clustering subject of the present invention.

FIG. 9 represents, a step of sharing a cluster, it is considered that each user has a device for sharing clusters.

Similarly to FIG. 6, FIG. 9 shows two graphs with the same axes 101 and 102, the top graph 900 shows a number of photographs taken over time by two users and the bottom graph 902 represents clusters over time. In between the top 900 and bottom 902 graphs, is a representation, 901, 904 and 905, of the sharing of a common cluster.

The photographs represented in graph 900 are taken by two distinct users, the photographs taken by one user are represented by dotted bars, the photographs taken by the user are represented by full lined bars. Similarly, the clusters

| DATE | THEME | EVENT | KEYWORDS | CHAINED | COMMON WITH |
|---|---|---|---|---|---|
| Oct. 31, 2017 | Halloween | Halloween | Halloween | | |
| Nov. 24, 2017 | | Car exhibition | | | Tom 50% |
| Nov. 27, 2017 | Journey | | Cat, Dog | | |
| Nov. 28, 2017 | X-mas | Tree lighting ceremony | X-mas, crowd | Chain 1 | |
| Dec. 18, 2017 | X-max | | shopping | Chain 1 | |
| Dec. 20, 2017 | Birthday | | Gift, candle, cake | | Bob 70% |
| Dec. 24, 2017 | X-mas | X-mas eve | Gift | Chain 1 | |
| Dec. 25, 2017 | X-mas | | | Chain 1 | | corresponding to the dotted bars of one user are represented by dotted lines, the clusters corresponding to the full lined bars are represented by full lines.

In the represented embodiment, compatible with other embodiments described above, a "shared cluster" 903 is being shared by applying one of the following rules:
- one of the users presses a share acceptance button after a suggestion is made;
- the pair of devices of users is in "permanent sharing" AND the two devices are paired during the common cluster, for example, pairing is made according to known techniques, for example with Bluetooth 901 and Google Fast Pair®;
- both devices are connected to the same Wi-Fi 904 server during a common cluster 604. This rule allows for example the person who receives for the birthday to put his smartphone in Wi-Fi server mode (personal hotspot), thanks to the known connection sharing feature launched by a dedicated application;
- both devices are linked on a social network 905;
- the pair of devices is in permanent sharing mode and the face of a user is recognized on the other user's device.

The sharing rules can be a combination of the rules described above, implement additional criteria provided by the social network, be adjustable by each user, comprise filters to select shared photographs according to their quality, faces, social groups, can be adapted to each user according to his profile and his preferences or to learn about these different features. They are extensible to more than two users.

At this stage, a database is constituted in which, a set of photographs, is segmented into clusters, common clusters 604 and shared clusters 903.

Figure 10:
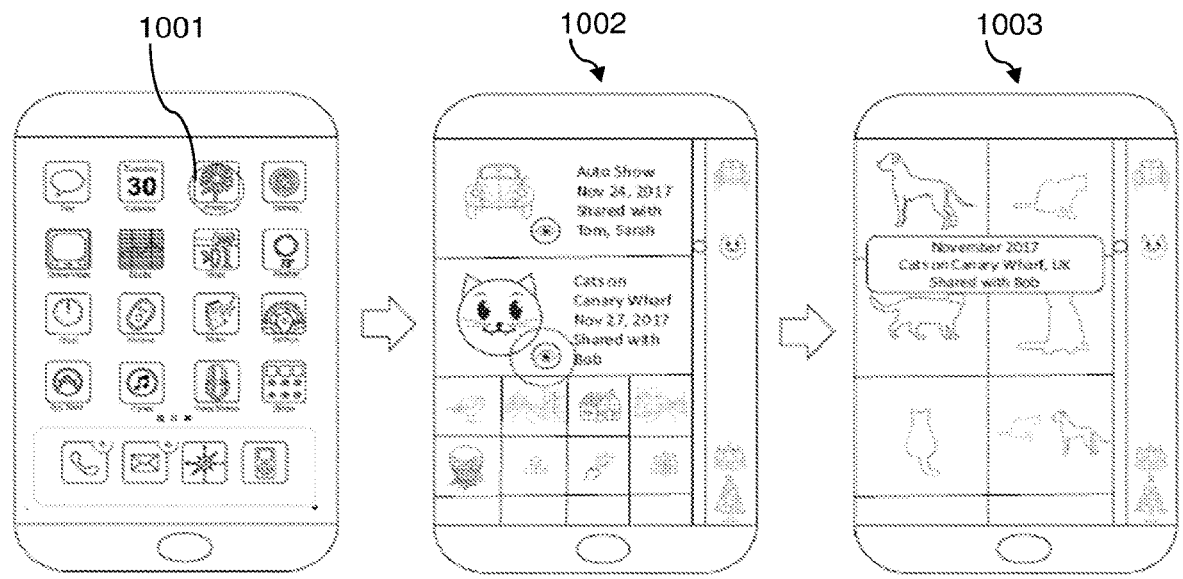
FIG. 10 represents, schematically, a display of clusters of the method for clustering subject of the present invention.

FIG. 10 represents an example of display of an application on a mobile device.

The method 3200 further comprises a step of automatically naming 3228 at least one folder depending on metadata of the photographs in a cluster and a step of displaying 3227 the folders containing the photographs of the corresponding cluster.

In FIG. 10, response to the activation 1001 of an icon representing an application giving access to the clustered photographs, the smartphone displays 1002 a thumbnail representing the clusters. The thumbnail can be tagged with:
- a typical average date of the cluster;
- an indication of sharing and the users concerned;
- a title composed with the keywords, the theme and the event;

In preferred embodiments, the name is composed in application of a model grouping a set of rules. For example if the cluster is characterized by:
- a dominant geographical position (i.e. "Canary Wharf");
- a date that can be linked to a particular event (i.e. Nov. 24, 2018—Auto show);
- a group of faces of similar age recurring (i.e. 8 people of similar age);

then the title structure will be "LOCATION—With friends YEAR" (i.e. "Venice Beach—With friends 2018").

In another example, if the cluster is characterized by:
- a date that can be linked to a particular event (i.e. Aug. 1, 2018-Aug. 15, 2018/Holidays);
- a group of recurrent faces of different ages (i.e. 5 people of different ages);
- a group of recurring objects (i.e. «beach», «Sun», «glass», «towel»/Beach)

then the title structure becomes "Family vacation YEAR" (i.e. "Family vacation 2018").

By selecting the icon representing an eye, the user visualizes the content 1003 of a cluster. The selection is represented by a dotted circle around the icon in the center panel of FIG. 10.

In particular embodiment, the method 3200 comprises a step of displaying 3227 at least one common cluster 903 in the form of a graph depending on the metadata of the photographs in the common cluster 903 and on the identified users sharing said common cluster.

The method results in the creation of a database of photographs, segmented into clusters, common clusters 604 and shared clusters 903. Thus, said database is organized as a graph of clusters rather than a social graph in the sense of those of social networks such as Facebook®. The nodes in this graph subject of the present invention are clusters rather than people. The clusters are shared by many people rather than many friends sharing their photographs.

Such an architecture facilitates the construction of the graph from the clusters and their sharing, rather than by people and their invitations to become friends. It also facilitates the construction of clusters that are prolonged in time (the history of a family home), recurring clusters (ski trips), clusters shared by an identified group (family) or trees of aggregated clusters (pavilion area/neighborhood/family/children/Jim). The set allows an optimized management of information exchanges in a social network when social links correspond to real experiences rather than buzz generators (memes, foodporn, chit chat). The shared cluster 903 is used as a basic social interaction. This corresponds to a documented reality, so it is richer than a simple user-to-user link.

In preferred embodiments, at least two users are each identified by a unique identifier, the unique identifiers of said users being associated in at least one memory as explained above. Each unique identifier comprising user metadata, one user having a cluster of photographs, the method 3200 further comprises a step of comparing 3229 user metadata representing another user to the photograph metadata within said cluster and, depending on the results of the comparison, a step of associating 3230 the another user to said cluster.

A user's clusters can be reconstructed a posteriori, i.e. a user can create a personal album from photographs taken by other users, i.e. by devices other than his own.

To establish the clusters of a user who has not taken a photograph, the following metadata can be compared:
- the geolocation of a smartphone, the proximity of a smartphone to a Bluetooth® transmitter or a Wi-fi® terminal indicate the places where the user is stationed;
- the proximity in a social graph with other people are presumptions of presence, for example a family during Christmas holidays;
- face recognition is an indicator of presence at a given time;
- an interaction with a photograph is a presumption of presence.

The result of the comparison is preferably a probability of presence of the user, other users associated with that cluster are asked to share their photographs. As a variant of FIG. 8, the message becomes: "Tom was there, too. Do you want to share the photographs with him?»

A user can be a sponsor of an event. For example, during a football match, the sponsor can offer other users present at the football match to share a cluster of photographs taken by a professional, the technical quality of the photographs being better. Each photograph taken by the professional can frame an advertisement such as a billboard, a place such as the Jules Verne restaurant on the Eiffel Tower or adopt the branding codes, i.e. the graphic universe and visual identity of the sponsor. The cluster can be accessible either by direct proposal of the sponsor user or by an additional proposal when shared between two other users. The cluster can then be auctioned off between the sponsors.

Direct advertising is considered invasive. Sponsors are looking for specific media to associate their advertising messages with them, such as water races or online thematic forums. Such embodiments make it possible to profile a shared cluster 903 that not only documents the theme (day at the park, birthday), place (geofence), time (event), profile of participants (age, gender, electronic equipment) but also qualifies the nature of this sharing (happy, alcoholic, family, social interactions).

Figure 11:
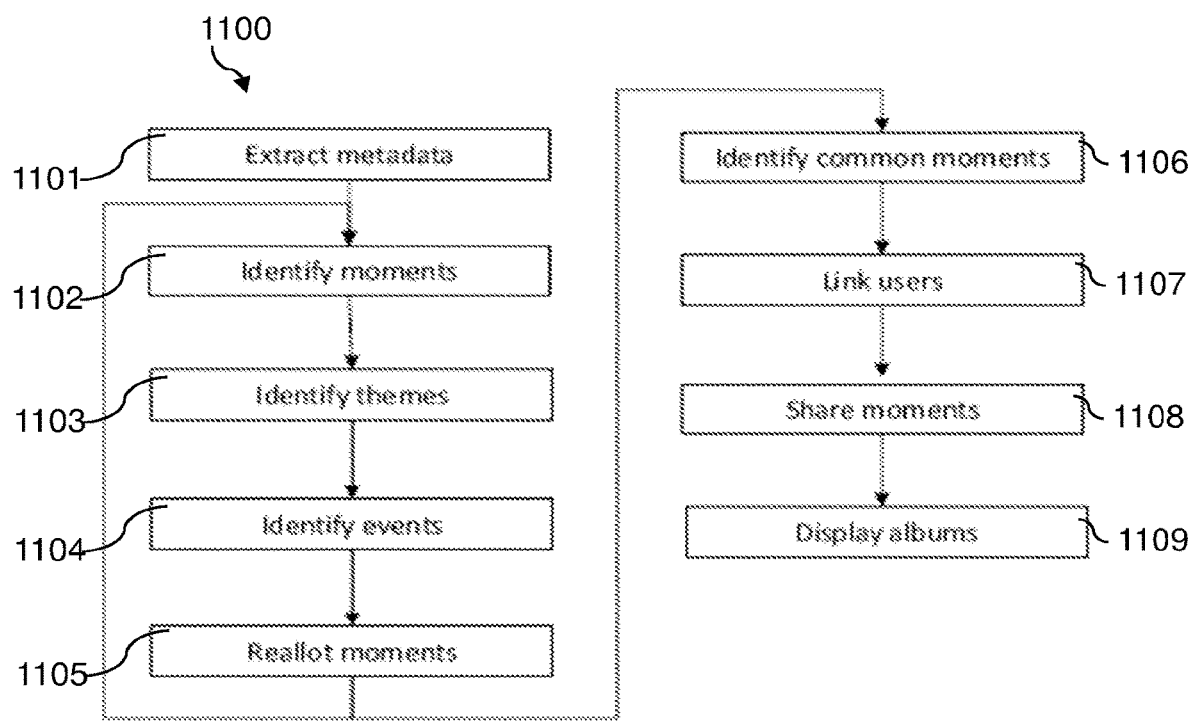
FIG. 11 represents, as a succession of steps, a fifth particular embodiment of the method for clustering subject of the present invention.

FIG. 11 represents a particular embodiment of the method for clustering represented in FIG. 32 and described with regards to FIGS. 1 to 10.

The following correspondence between steps can be established:
  step 1101 corresponds to step 3202;
  step 1102 corresponds to step 3218;
  step 1103 corresponds to step 3209;
  step 1104 corresponds to step 3220;
  step 1105 corresponds to step 3222;
  step 1106 corresponds to steps 3223 to 3324;
  step 1107 corresponds to step 3225;
  step 1108 corresponds to step 3226;
  step 1109 corresponds to step 3227.

The steps represented in FIG. 32 and corresponding to embodiments of the method can be performed by a device containing a camera, a memory for recording the captured photograph, a clock, and computing means such as a digital camera, a mobile device, a smartphone, a tablet, for example.

Method for Retrieving

The method for retrieving subject of the present invention is described with regards to FIGS. 12 to 23 and 33, depicting different embodiments of the method for retrieving. The method for retrieving subject of the present invention can be combined with the method for clustering and the method for sharing subject of the present invention. For example, the method for retrieving can be used during the step of displaying of the method for clustering subject of the present invention described above.

The method for retrieving is preferably performed on an electronic device comprising a screen, computation means, a human-machine interface and communication means with a network.

FIGS. 12 to 23 will be described with regards to the steps shown in the flow chart of FIG. 33.

Figure 12:
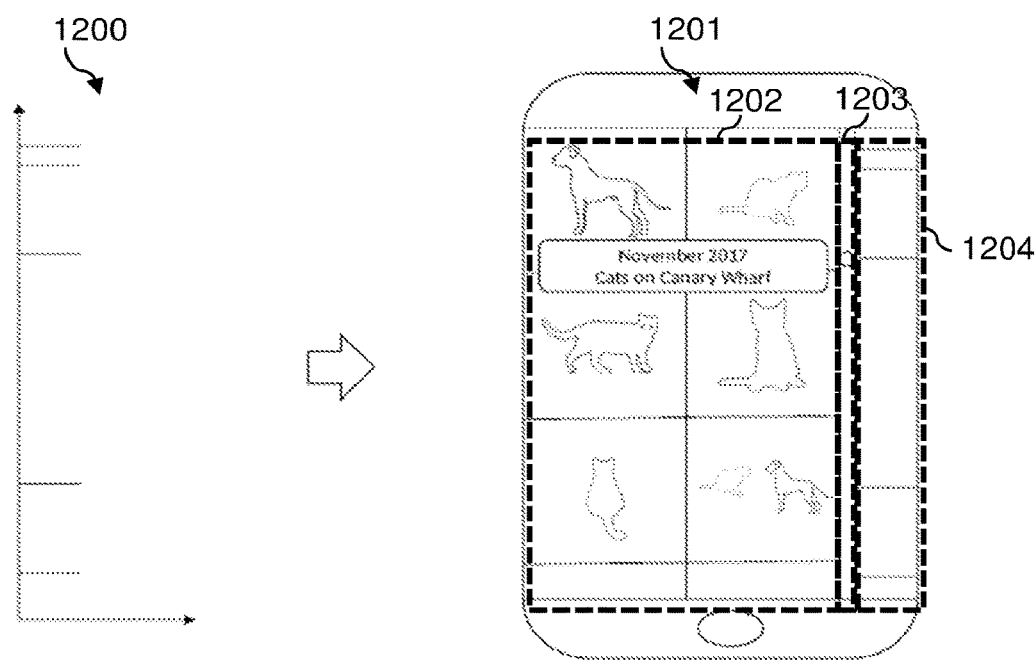
FIG. 12 represents, schematically, a first embodiment of a method for retrieving subject of the present invention.

FIG. 12 represents a first embodiment of a method for retrieving at least two captured photographs.

The method 3300 comprises:
  a step of capturing 3301 at least two photographs;
  a step of extracting 3302 metadata from the photograph captured;
  a step of displaying 3308 on a screen:
    at least one thumbnail representing at least one photograph on a first part 1202 of the screen 1201,
    at least one icon representing the extracted metadata on a second part 1204 of the screen 1201 parallel to the first part, the icon representing the extracted metadata corresponding to at least two photographs.
  a step of moving 3309 the at least one thumbnail and icon upon action by a user on the screen 1201, the movement of the icons being proportional and simultaneous to the movement of the thumbnails.

Preferably, the step of displaying 3308, a scrollbar is displayed on a third part 1203 of the screen 1201 parallel to the first part.

The steps of capturing 3301 and extracting 3302 preferably correspond to the steps of capturing 3201, assigning 3202 and extracting 3209 described above during the description of the embodiments of the method for clustering subject of the invention.

The metadata extracted can be one or more of the following metadata or any metadata described above:
  a timestamp;
  a geolocation;
  extracted features, such as objects, faces, an atmosphere, features relative to the quality of the photography;
  a theme; and/or
  an event.

FIG. 12 represents, on the left, a graph 1200 representing clusters obtained by applying the method for clustering subject of the invention. On the right is a representation of a display according to the step of displaying 3308.

In response to pressing a photo icon on a general menu of a device, the user interface displays all photographs chronologically in three parts, 1202, 1203 and 1204. The three parts are disposed in columns, from the top of a screen 1201 to the bottom, from left to right, on the left is the first part 1202, on the right is the second part 1204 and the third part 1203 is in between the first and third parts.

Preferably, the first part 1202 takes up more than 50% of the available screen space.

The icon representing extracted metadata in the second part 1204 can be an icon representing clusters issued from the method for clustering subject of the present invention.

In preferred embodiments, the method 3300 comprises a step of determining 3304, for each metadata; the number of photographs associated to the same metadata and a step of adapting 3305 the size of the representation depending on the relative number of photographs associated to each metadata. The step of determining 3304 can be performed by a counting or a sorting algorithm.

During the step of adapting 3305, the second part 1204 is divided into vertical segments and shown that identical to the position of the icon representing extracted metadata on a time scale. In fact, the size of each segment of the second part 1204 is proportional to the number of photographs of the corresponding extracted metadata.

The elements of the three parts, 1202, 1203 and 1204, are vertically movable according to the slide of the finger of the user on the touch surface, if the screen is a touchscreen, for example.

Figure 13:
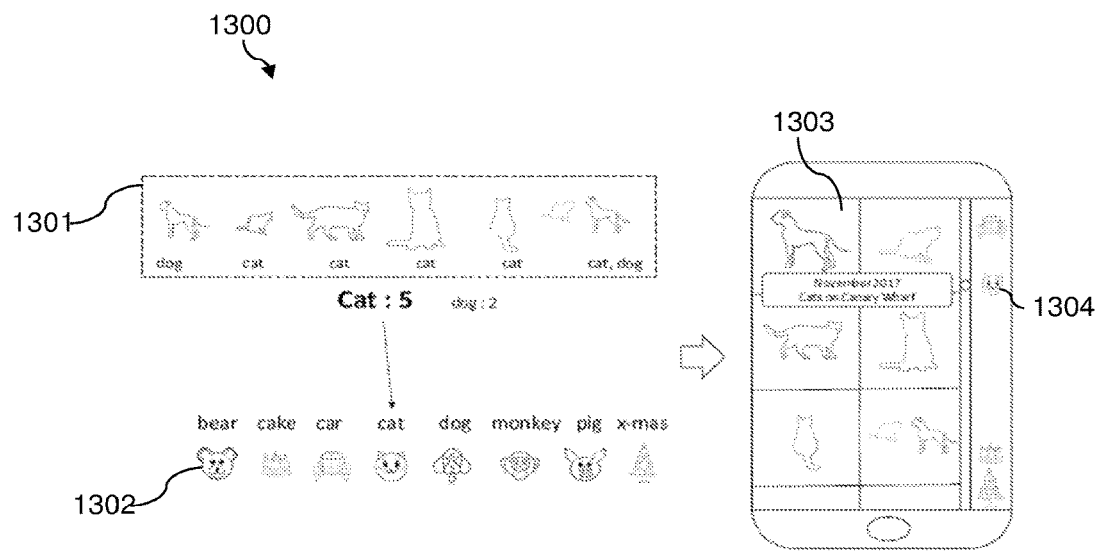
FIG. 13 represents, schematically, a second embodiment of a method for retrieving subject of the present invention.

FIG. 13 represents a second embodiment 1300 of the method for retrieving subject of the present invention.

The method 3300, further comprises a step of associating 3303 the content extracted to an object represented by an icon in a database, the icon being displayed in the second part of the screen.

Preferably, the device performing the method for retrieving subject of the invention is further equipped with a memory storing a database associating objects and icons and/or an access to a remote network storing said database.

A first part of FIG. 13 counts the extracted features 1301 from the photographs contained in metadata. The metadata of the photographs 1303 contain the object designation ("cat", "dog") recognized in the photographs. After listing the metadata 1302 of the photographs, the most representative object of the cluster, "cat" in FIG. 13, is selected and becomes a pointer 1304. By matching with the database, the icon associated with this pointer 1304 is selected. This icon, representative of the feature is displayed in the second part of the screen 1204 at the end of the segment representing this feature.

Figure 14:
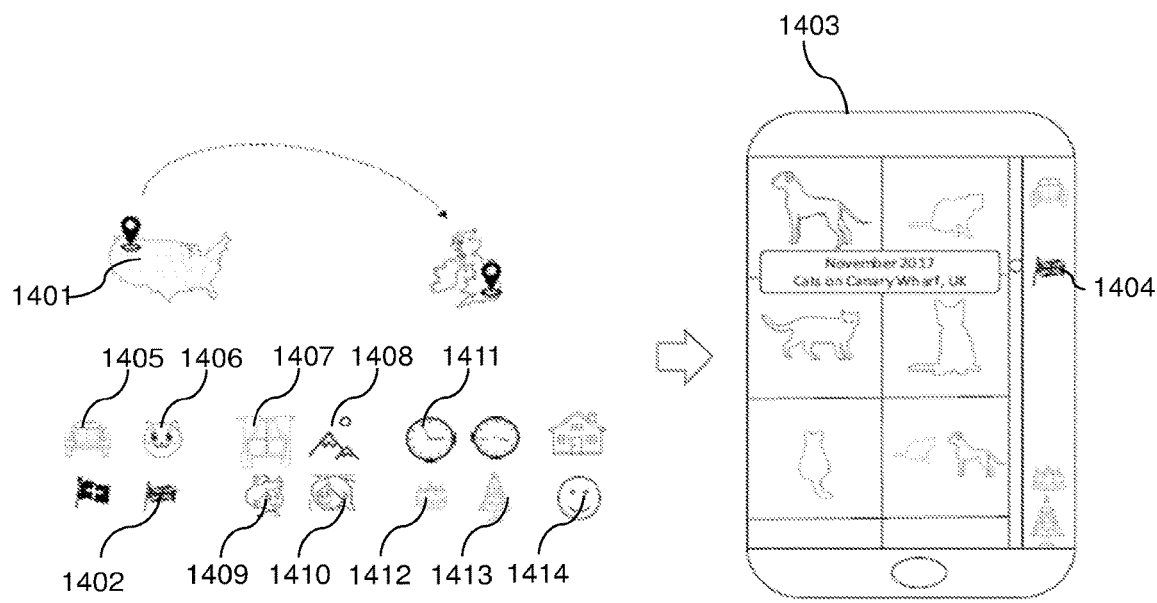
FIG. 14 represents, schematically, a third embodiment of a method for retrieving subject of the present invention.

FIG. 14 represents a third embodiment of the method for retrieving subject of the present invention.

In FIG. 14, in addition to the objects recognized in the photographs, such as dog, cat 1406, car 1405, the metadata are of several types, for example:

- geolocation 1401 such as countries, cities, places,
- context, such as indoor 1407, mountain 1408;
- faces recognized, such as Jim 1409, Anna 1410;
- timestamp, such as Monday 2:45 1411;
- theme 1402 such as birthday 1412, Christmas 1413;
- social group, such as family, friends;
- expression of faces and attitudes such as smiles 1414;
- technical note;
- personalized note;
- popularity;
- luminous atmosphere; and/or
- color and context.

The database, beyond objects, associates icons with the above-mentioned other types of metadata. From then on, the pointer 1304 may be of any type of metadata.

In preferred embodiments, wherein the extracted metadata is defined by a type, the method further comprises a step of selecting 3306 the type of metadata to represent depending on the proportion of said type of metadata extracted from the photographs. In preferred embodiments, the step of selecting the type of metadata depends on a predefined set of rules.

For example, the selection of the metadata type is made according to the following rules:

- the type is the geolocation if the average geolocation of the icon representing extracted features is more than 100 km away from the user's home
- else, type selected is a theme if a predefined theme is identified in more than 20% of the photographs of the icon representing extracted features,
- else, the type selected is an object if an object is identified in more than 20% of the photographs of the icon representing extracted features,
- else, the type selected is a face if a face is identified in more than 20% of the photographs of the icon representing extracted features, Thus, the geolocation of a photograph to Canary Wharf located more than 100 km from the home of the user living in the United States requires the type of pointer to be "geolocation". By association in the database, the pointer selects the icon "flag of the United Kingdom" 1402. This icon 1404 is displayed in the second part 1204 of the screen at the end of the segment representing the cluster "Cats on Canary Wharf" as represented on the right panel 1403 of FIG. 14.

Figure 15:
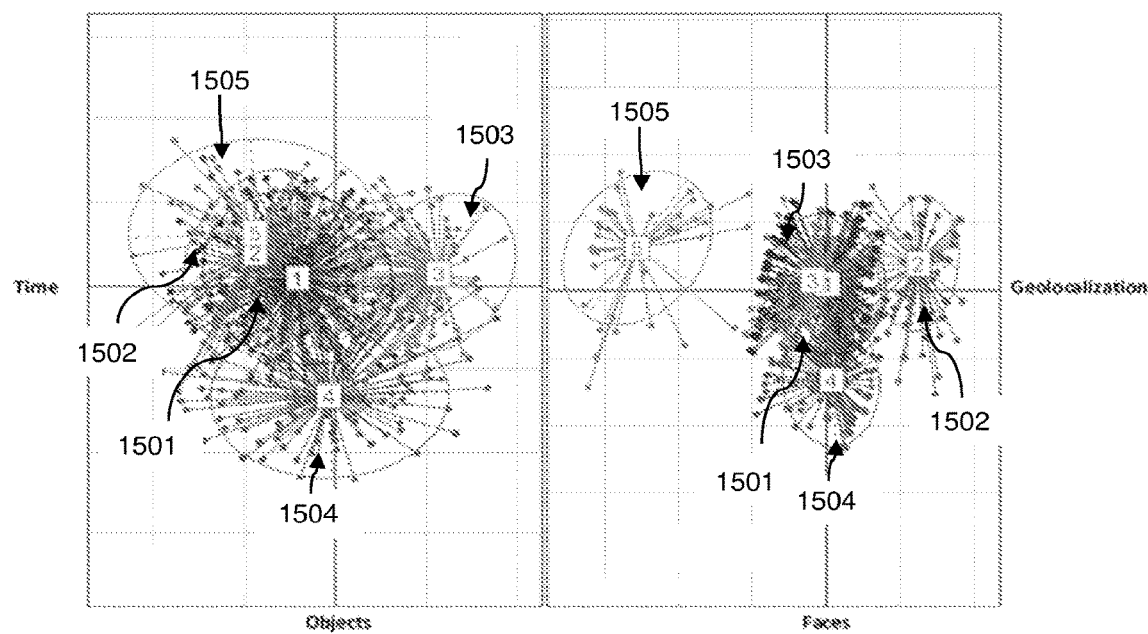
FIG. 15 represents, schematically, photographs organized in clusters.

FIG. 15 represents photographs organized in clusters 1501 to 1505 in two-dimensional planes depending on types of metadata. It can be seen, on FIG. 15 that most photographs have geolocation metadata. FIG. 15 represents five clusters numbered from 1501 to 1505 represented according to four dimensions, the identified objects and the timestamp on the left and the faces and geolocation on the right.

In preferred embodiment, the selection of metadata type depends on the following rule, if photographs have been clustered, for example by the method of clustering subject of the present invention; the type selected is the most discriminating type of metadata to create clusters. The most discriminating type of metadata in the one for which the clusters are most significantly set apart. In the example of FIG. 15, the type selected would be geolocation which shows a clear separation of clusters 1502 and 1505.

In some embodiments, the method for retrieving 3300 comprises a step of applying 3307 a machine learning algorithm to modify the set of rules, the machine learning algorithm being applied to at least one parameter representative of a user habit in relation to said set of rules. For example, a user habits taken into account can be the reorganization of photographs or the manual selection of a type.

Figure 16:
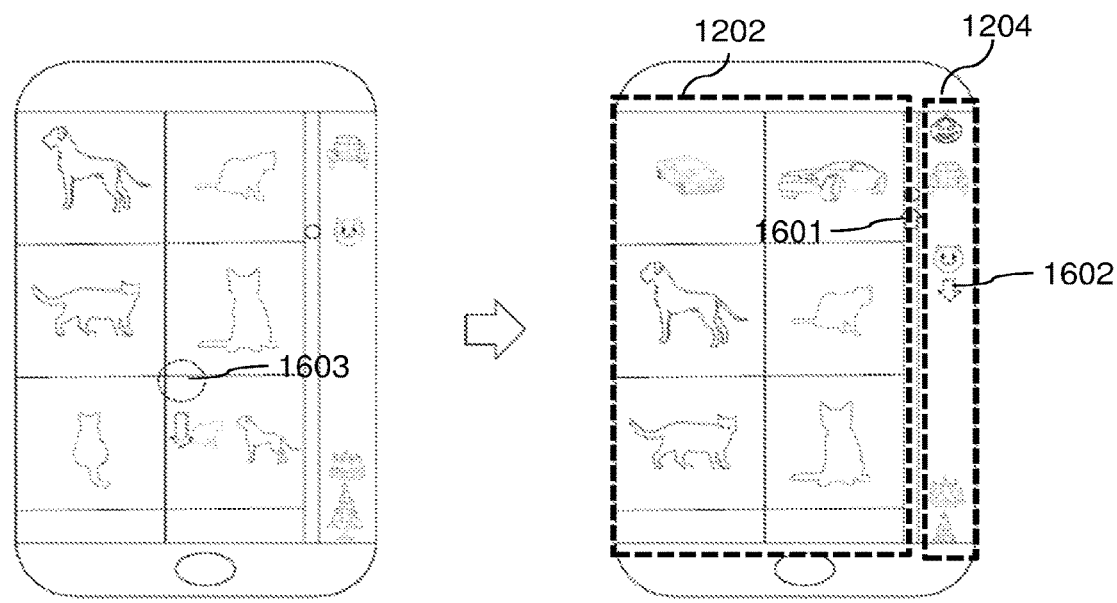
FIG. 16 represents, schematically, a fourth embodiment of a method for retrieving subject of the present invention.

FIG. 16 represents a fourth embodiments of the method for retrieving subject of the present invention.

In the embodiment of FIG. 16, when a user scrolls upwards through the thumbnails, for example by sliding the thumbnails down 1603 in the first part 1202 as represented on the left screen of FIG. 16, the scrollbar moves upwards 1601 in the third part 1203 and the representation moves downwards 1602 in the second part 1204. The scrollbar represents a scroll simultaneously through each photograph and each icon representing metadata.

The method 3300 comprises a step of moving 3309 the at least one thumbnail and icon upon action by a user on the screen, the movement of the icons being proportional and simultaneous to the movement of the thumbnails.

In FIG. 16, the vertical sliding of the user in the first part 1202 of the touch screen causes the scrolling at the same speed and in the same direction of the thumbnails of said first part, in a manner known to one skilled in the art. This sliding causes the scrolling at a proportional speed and in the opposite direction of the cursor or scrollbar in the third part of the screen 1203. The proportionality coefficient is the quotient of the virtual size of all the vignettes or thumbnails that can appear in the first part 1202 and the size of the third part 1203, in a manner known to one skilled in the art.

The sliding also causes the scrolling of the icons of the second part 1204 at a proportional speed of the thumbnails of the first part 1202, in the same direction. The coefficient of proportionality is the quotient of the virtual size of all the thumbnails or vignettes that can appear in the first part 1202 and the virtual size of all the segments that can appear in the second part 1204.

Thus, the coincidence of the cursor and the icon representing extracted metadata corresponds to the display of the photographs of the picture containing said metadata in the first part 1202.

Figure 17:
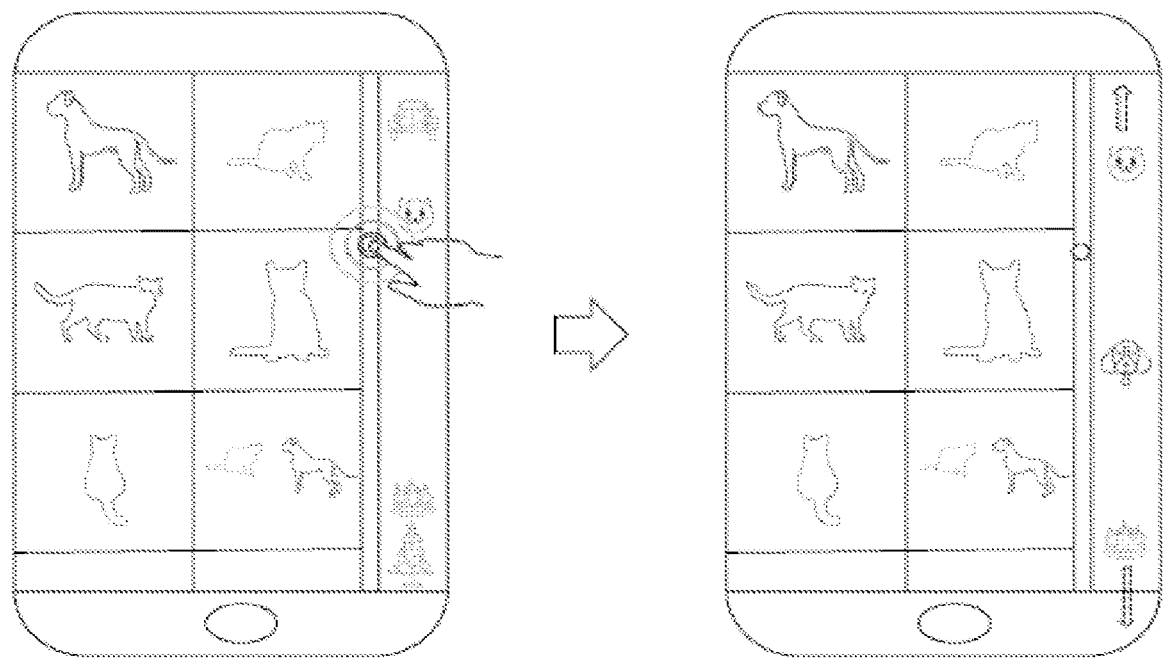
FIG. 17 represents, schematically, a fifth embodiment of a method for retrieving subject of the present invention.

FIG. 17 represents a fifth embodiment of the method for retrieving subject of the present invention.

In response to a user's gesture on the touch screen represented on the left side of FIG. 17, the elements and the size of the segments of the second part 1204 are recalculated. Prolonged pressing of the finger on the cursor in the third part 1203 causes an expansion effect of the second part 1204, that is to say an increase in the size of all the segments of the representation a metadata as represented on the right side of FIG. 17.

Figure 18:
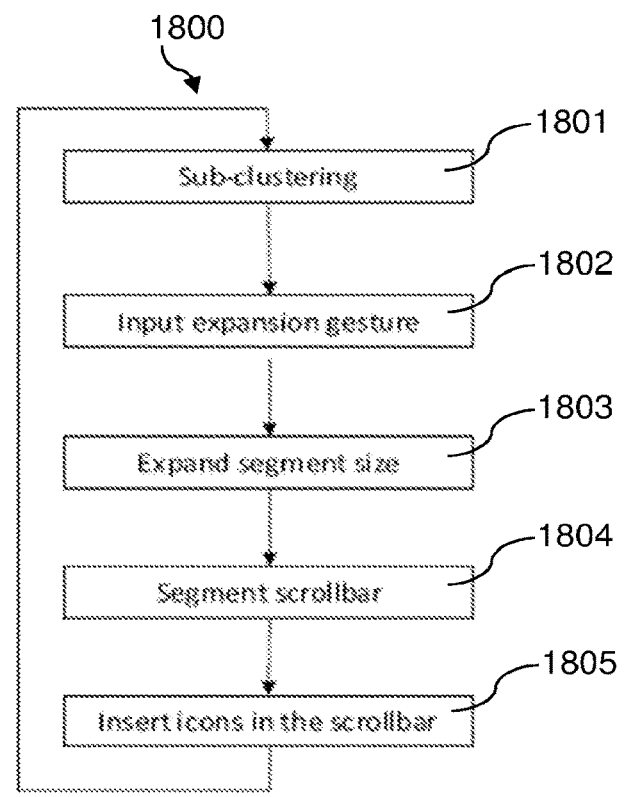
FIG. 18 represents, schematically, the fifth embodiment of a method for retrieving subject of the present invention.

The succession of steps applied to perform the resizing of segments represented in FIG. 17 is depicted in FIG. 18.

The method 3300 preferably comprises a step of selecting 3310 an icon representing metadata, the photographs associated to said metadata being selected, and a step of representing 3311 another metadata associated to the selected photographs. The steps of selecting 3310 and representing 3311 are detailed with regards to FIG. 18.

In FIG. 18, the increase 1800 in the size of the segments of the second part 1204 is performed by:

- a step of sub-representation 1801 is triggered as soon as there are less than five visible segments, if at least one of the segments corresponds to a representation that can be sub-represented, a step of inputting a gesture by the user triggers a step of expanding 1803 the segment size;

a step of segmentation 1804 of the second part is performed depending on the number of sub-segments of a representation; and a step of insertion 1805 of icons representative of the sub-segments is performed.

For example, a gesture can be touching for more than two seconds in the case of a touch screen, or three-dimensional touching on the screen in the case of a three-dimensional touch screen known to one skilled in the art.

In preferred embodiments, during the step of expanding, the size of the segments increases by 20% per second as long as the finger touches the screen.

In preferred embodiments, the sub segments, once deployed, take each maximum 25% of the total height of the screen with a decrease proportional to the number of photographs corresponding to the sub-segment displayed on the screen at the same time. Preferably, up to fifteen sub-segments are displayed.

In some embodiments, a fast scroll, at the boundaries of the top border of the top sub-segment or the bottom border of the last sub-segment, closes the sub-segments and causes the device to display the initial visual configuration.

Figure 19:
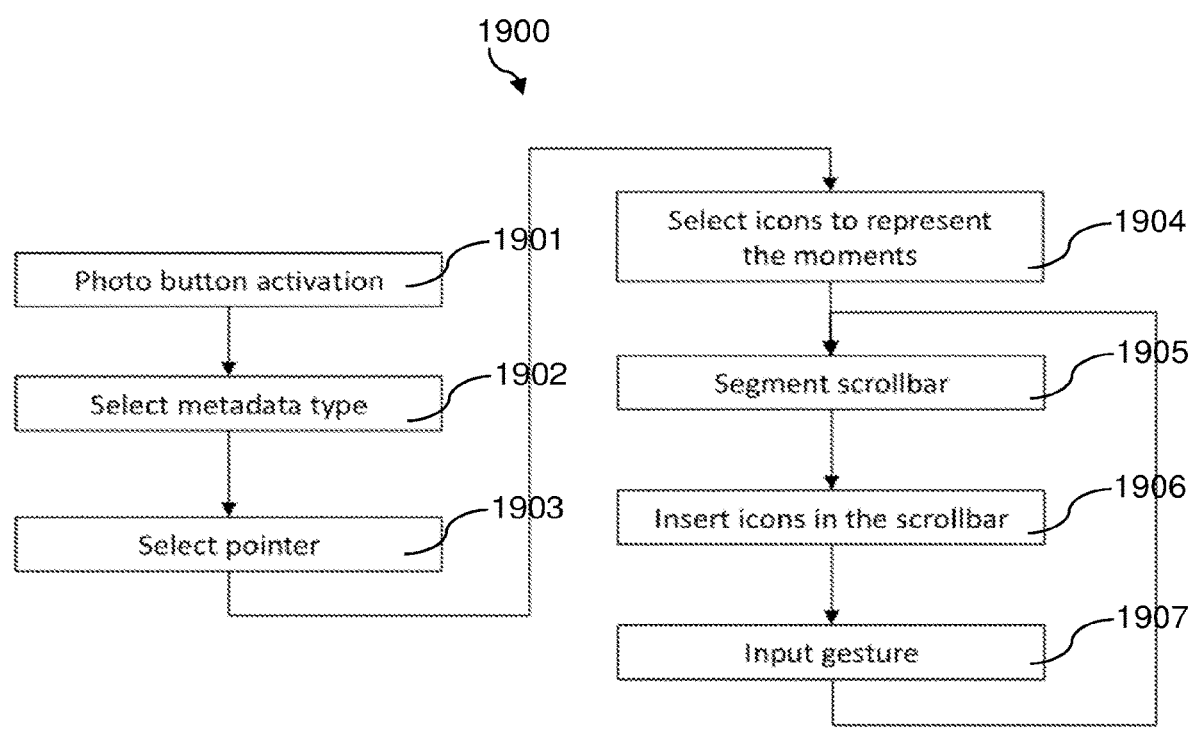
FIG. 19 represents, schematically, an eighth embodiment of a method for retrieving subject of the present invention.
Figure 33:
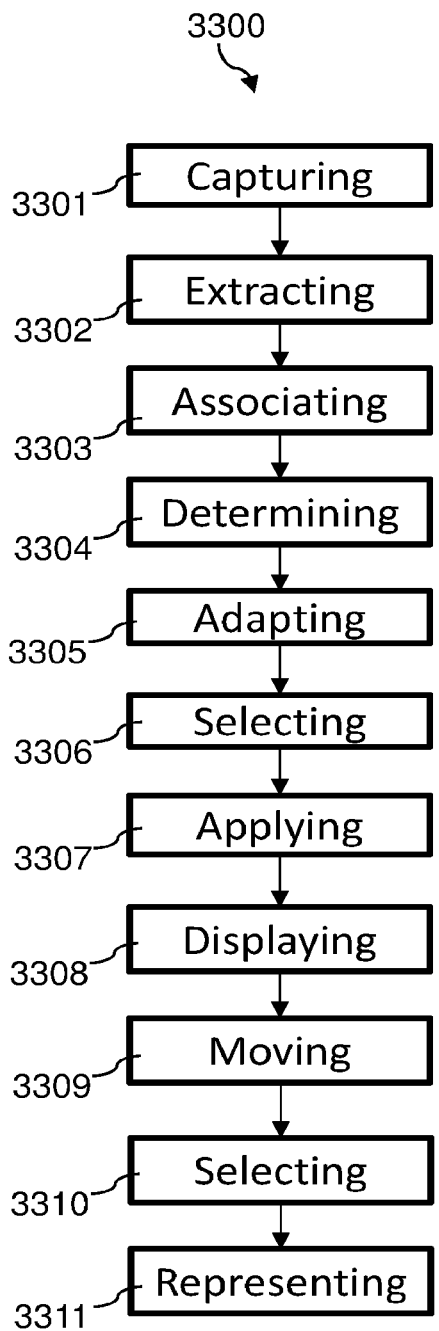
FIG. 33 represents, as a succession of steps, a ninth particular embodiment of the method for retrieving subject of the present invention.

FIG. 19 represents a particular embodiment 1900 of the method for clustering represented in FIG. 33 and described with regards to FIGS. 12 to 18.

The following correspondence between steps can be established:

step 1902 corresponds to step 3306;
step 1903 corresponds to step 3303;
step 1904 corresponds to step 3303;
step 1905 corresponds to steps 3304 and 3305;
step 1906 corresponds to step 3308;
step 1907 corresponds to step 1802;

Step 1901 corresponds to the launch of an application interacting with the photographs of the user on the device main interface.

The steps represented in FIG. 33 and corresponding to embodiments of the method can be performed by a device containing a camera, a memory for recording the captured photograph, computing means a screen and a man-machine interface such as a digital camera, a mobile device, a smartphone, a tablet, for example.

Figure 20:
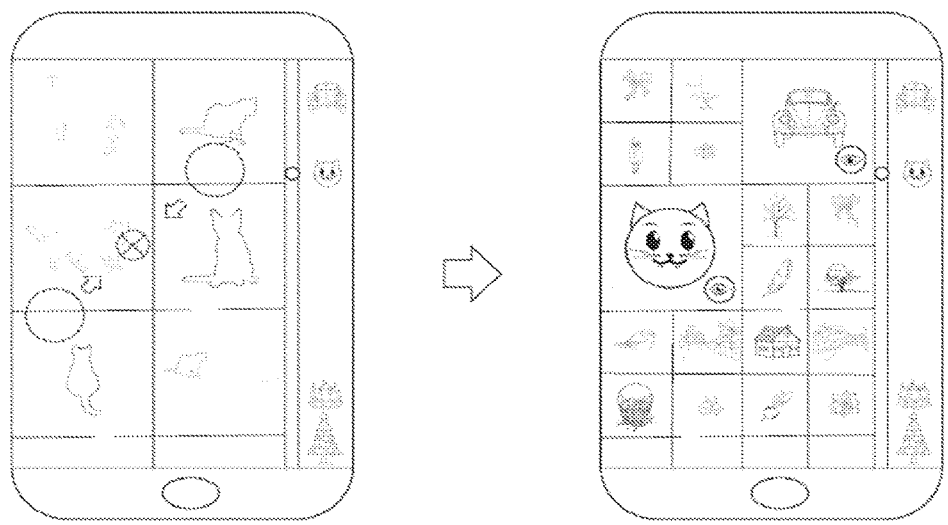
FIG. 20 represents, schematically, an interface in which a narrowing movement is performed for a method for retrieving subject of the invention.

FIG. 20 shows an interface in which a narrowing movement is performed. A narrowing movement, in which two fingers of the user are positioned on a touch screen and moved closer by sliding on said touch screen, causes a decrease in the size of the displayed image on a touch screen in the prior art. In the present invention, as represented on FIG. 20, said gesture causes the display of thumbnails representing the "cat" and "car" clusters to replace all the images grouped in these clusters.

Figure 21:
FIG. 21 represents, schematically, a table of metadata extracted from at least one photograph.
Figure 22:
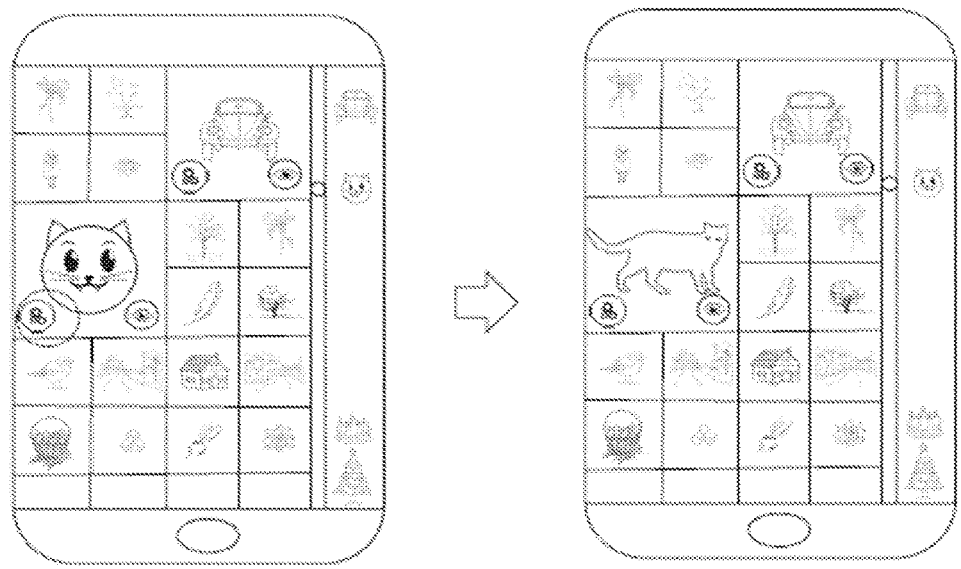
FIG. 22 represents, schematically, an interface of a method for retrieving subject of the present invention.

FIGS. 21 and 22 are linked: the table in FIG. 21 of the associated photos and metadata represented in FIG. 22. FIG. 21 represents a table of metadata extracted from at least one photograph and FIG. 22 represents an interface of a method for retrieving subject of the present invention.

In FIG. 21, the lines of the table represent:
line 1: photos;
line 2: identified objects and probability rate;
line 3: if the photo has been grouped together in the cluster called; "cat";
line 4: technical quality note of the photo; and
line 5: overall score of the photo, calculated on the basis of lines 2 to 4.

The selected photo is the one with the highest score on line 5.

When the user selects the "settings" button of the "cat" thumbnail represented in FIG. 22 on the bottom left of the icon representing a cat in the first part of the display, the thumbnail of the "cat" cluster displays the selected photo instead of the logo from the logo database, for example selected in FIG. 13. Pressing the "settings" button again restores this logo. The pressing of a button is represented by a dotted line circle surrounding the button.

Figure 23:
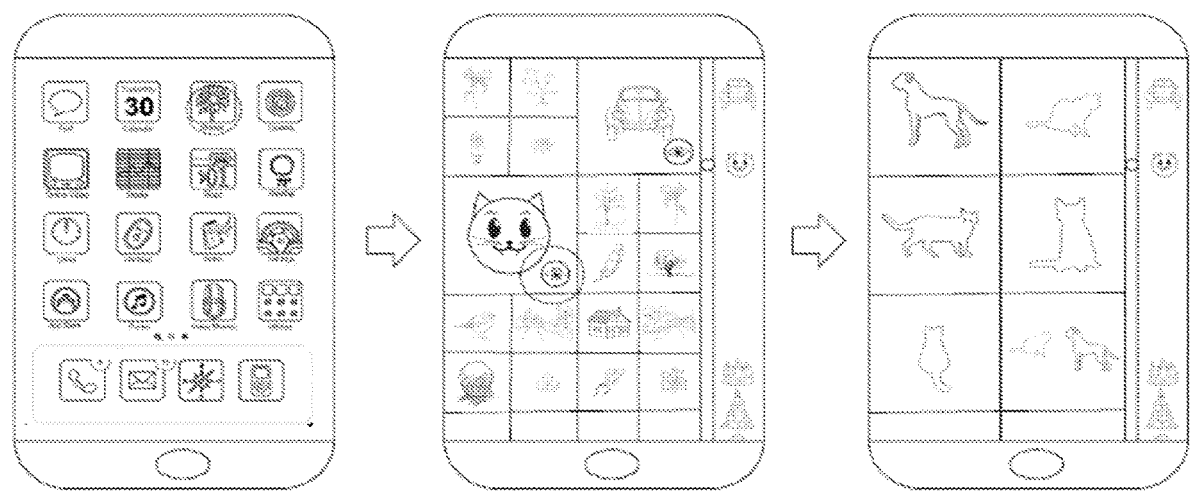
FIG. 23 represents, schematically an interface of a method for retrieving subject of the present invention.

FIG. 23 represents another interface of a method for retrieving subject of the present invention. In FIG. 23, the pressing of a button representing an eye associated with a thumbnail returns all images to their original display. The pressing of a button is represented by a dotted line circle surrounding the button.

Method for Sharing

The method for sharing subject of the present invention is described with regards to FIGS. 24 to 31 and 34, depicting different embodiments of the method for sharing. The method for sharing subject of the present invention can be combined with the method for clustering and the method for retrieving subject of the present invention. For example, the method for sharing can be used during the step of sharing of the method for clustering subject of the present invention described above.

The method for sharing is preferably performed on an electronic device comprising a screen, computation means, a human-machine interface and communication means with a network.

FIGS. 24 to 31 will be described with regards to the steps shown in the flow chart of FIG. 34.

Figure 34:
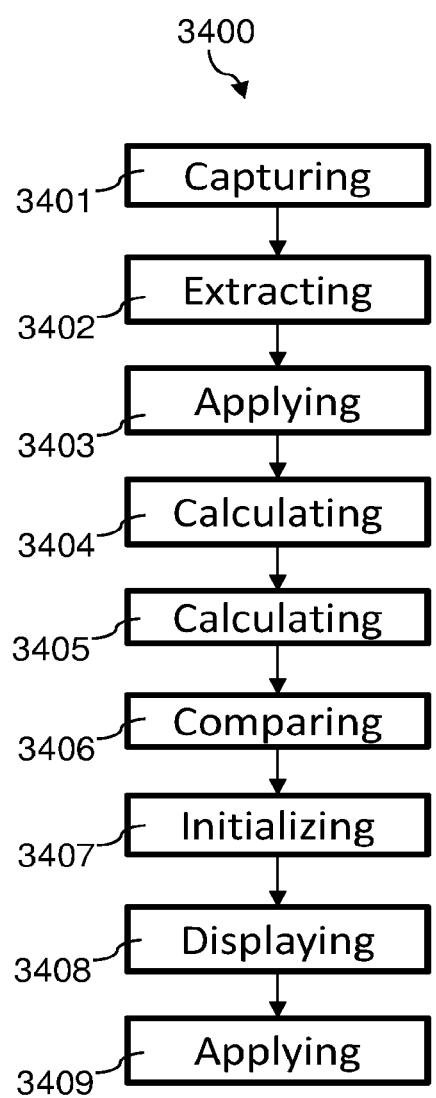
FIG. 34 represents, as a succession of steps, a third particular embodiment of the method for sharing subject of the present invention.

FIG. 34 represents a method 3400 for sharing a photograph between at least two users each identified by a unique identifier on a network. The method 3400 comprises:

a step of capturing 3401 a photograph by a first user;
a step of extracting 3402 metadata from the photograph captured;
a step of calculating 3404 a photograph interaction rating depending on data representative of the first user and each other user and on the extracted photograph metadata;
a step of comparing 3406 the photograph interaction rating of the pairs of users to a first predefined limit value; if the photograph interaction rating is superior to the first predefined limit value, a step of initializing 3407 a contact between said users.

In preferred embodiments, the step of initializing a contact is upon validation by the first user.

The steps of capturing 3401 and extracting 3402 preferably correspond to the steps of capturing 3201, assigning 3202 and extracting 3209 described above during the description of the embodiments of the method for clustering subject of the invention.

The metadata extracted can be one or more of the following metadata or any metadata described above:
a timestamp;
a geolocation;
extracted features, such as objects, faces, an atmosphere, features relative to the quality of the photography;
a theme; and/or
an event.

Other extracted metadata from the photograph comprises data representative of at least one action performed by a user with regards to the photograph.

Figure 24:
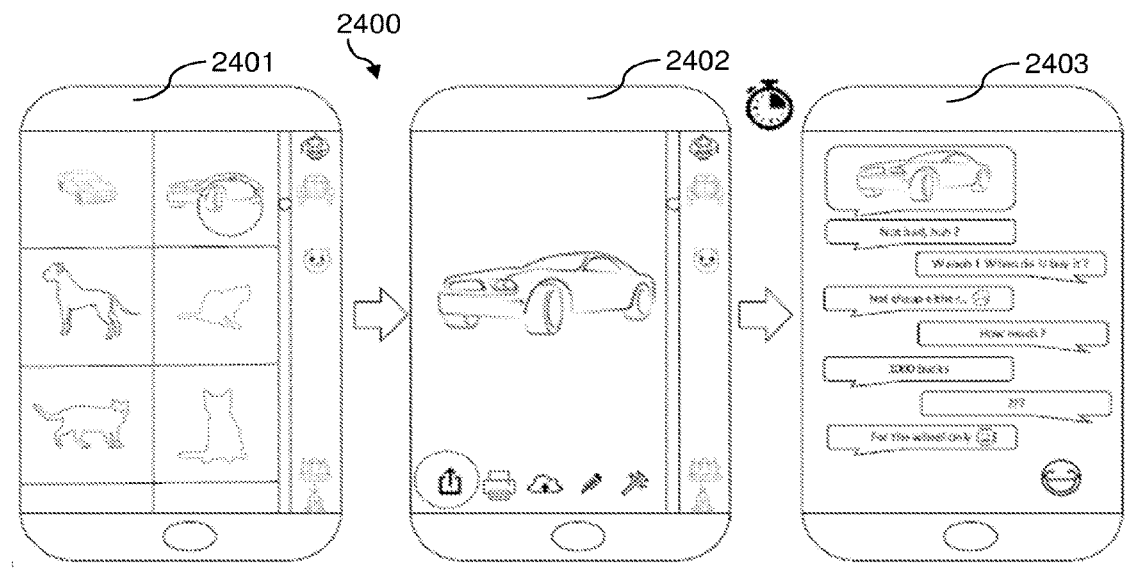
FIG. 24 represents, schematically, extracted metadata for a method for sharing subject of the present invention.

FIG. 24 represents three different successive screens 2400 chronologically presented from left to right. In FIG. 24, the extracted metadata is a sentiment.

In the first panel 2401, the user selects a photograph with a gallery. The gallery can be presented according to the method for retrieving subject of the present invention. In the second panel 2402, the user shares the selected photograph on a social network by known techniques to one skilled in the art. In the third panel 2403, the user exchanges with the user(s) the photograph has been shared with on the social network, for example through personal messages. These comments are tagged "friendly" by known sentiment analytics techniques. The tag is an extracted metadata of the photograph.

Figure 25:
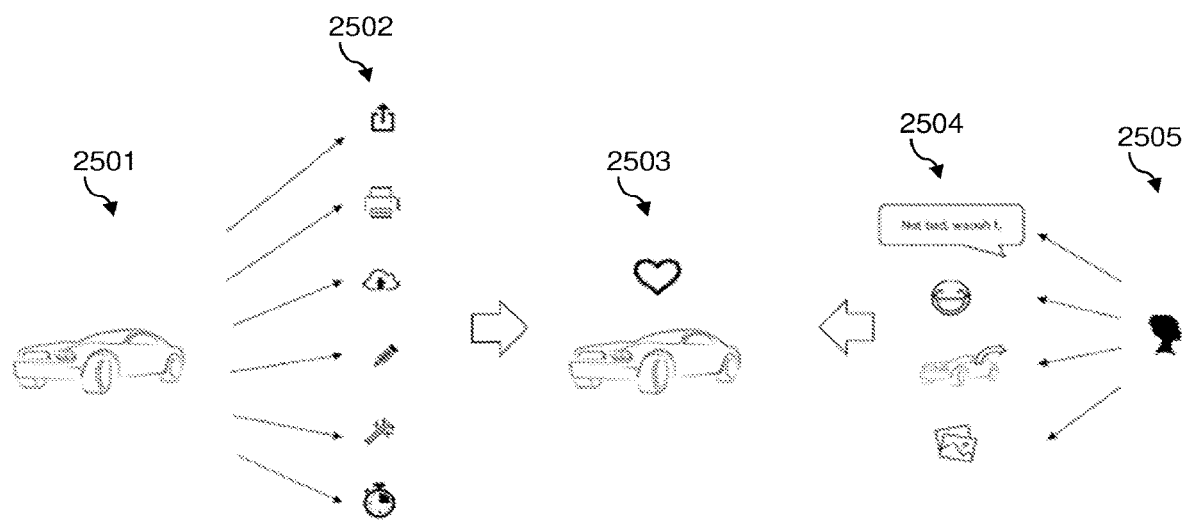
FIG. 25 represents, schematically, different actions that can be performed on a photograph for a method for sharing subject of the present invention.

FIG. 25 represents different actions that can be performed on a photograph by the user to which the photograph belongs and by other users of the social network. The actions performed are added to the metadata concerning the photograph.

Actions performed, also named "usage traces" 2502 and 2504 are metadata, to which are added other actions of the user, who for example:
- prints the photograph 2501;
- shares the photograph 2501 in a remote server such as a cloud;
- edits and/or modifies the photograph 2501.

The other actions can be performed automatically or specifically for said photograph, and/or in a timed manner.

Usage traces 2504 comprise interaction traces with at least one other member 2505 of the social network such as:
- at least one sentiment, obtained through sentiment analysis techniques for example;
- at least one comment
- at least one emoji;
- at least one photograph resharing;
- sharing at least one related picture of the other member 2505.

In order to differentiate the user capturing the photograph to other users of a network, the other users are hereafter named members.

A Metadata rating 2503 can be defined based on usage traces. The metadata rating can comprise a technical rating, a popularity rating and a tailored rating. The technical rating depends on the inherent quality of the photograph, for example, overexposure, framing or blurring. The popularity rating depends on the quantity and type of interactions traces. In other words, the popularity rating is based on the circulation of the photograph on the social network. The tailored rating depends on the usage traces 2502 and 2504. For example, the tailored rating is calculated as follows:
- each action of the user contributes to the rating, according to a predefined scale (share+1, print+1, cloud+1, edit+1 for every 5 minutes)
- each action of another user 2505 contributes to the rating, according to a predefined scale (emoji+10%, forward+10%, photograph return+20%, multiplier sentiment note).

The metadata rating 2503 makes it possible to rank photographs for the user, for example:
- the technical rating hides or highlights photographs according to their quality; and
- the popularity rating discourages or encourages photograph sharing based on their virality.

In preferred embodiments, the metadata rating 2503 is updated frequently. The frequency of the update can depend on an elapsed time since the last update or a number of photographs captured since the last update. For example, if the tailored rating exceeds a predefined threshold and the photograph has not been used for more than two years, then put forward this photograph by an automatic inlay in the photograph gallery and update the tailored rating of the photograph according to new user actions:
- if the user acts with regards to the photograph, increase the rating;
- if the user does not act within a predefined time limit, decrease the rating.

In some embodiments, the method comprises a step of updating tailored rating of at least one other photograph of the gallery that has a similar metadata profile.

A metadata profile can be defined as the type and content of metadata of a photograph.

Figure 26:
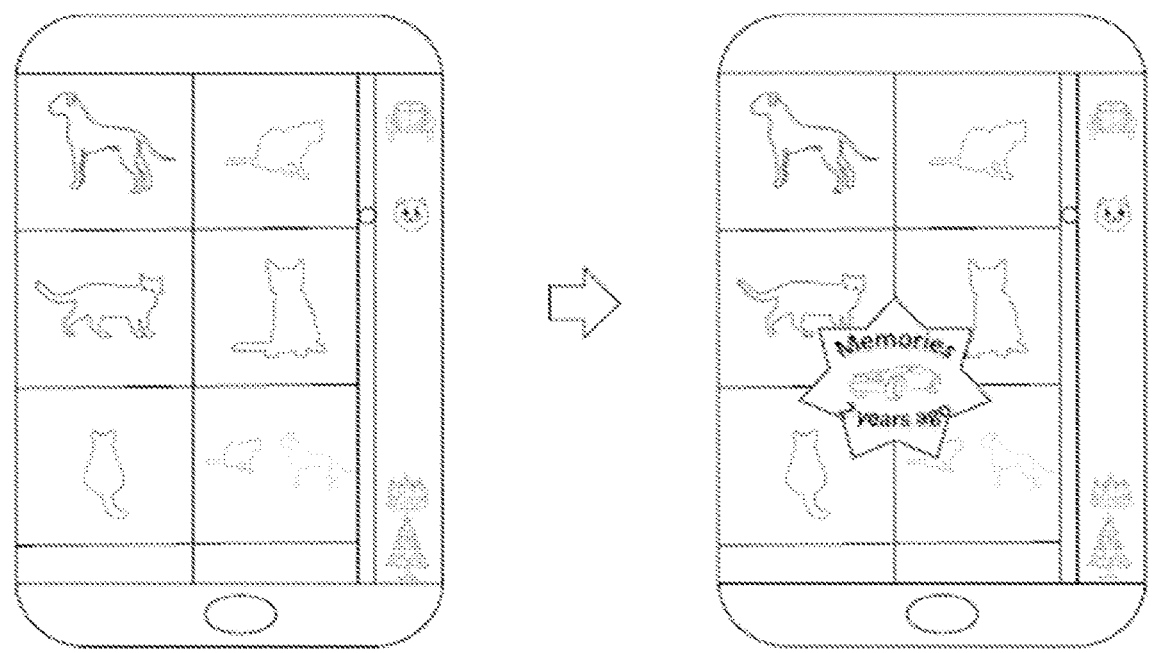
FIG. 26 represents, schematically, a user interface for a method for sharing subject of the present invention.

FIG. 26 represents an inlay in the photograph gallery corresponding to the steps described above. The inlay is an icon overlapping the photographs in the gallery indicating for example "Memories 2 years ago" and containing a thumbnail of the photograph.

Figure 27:
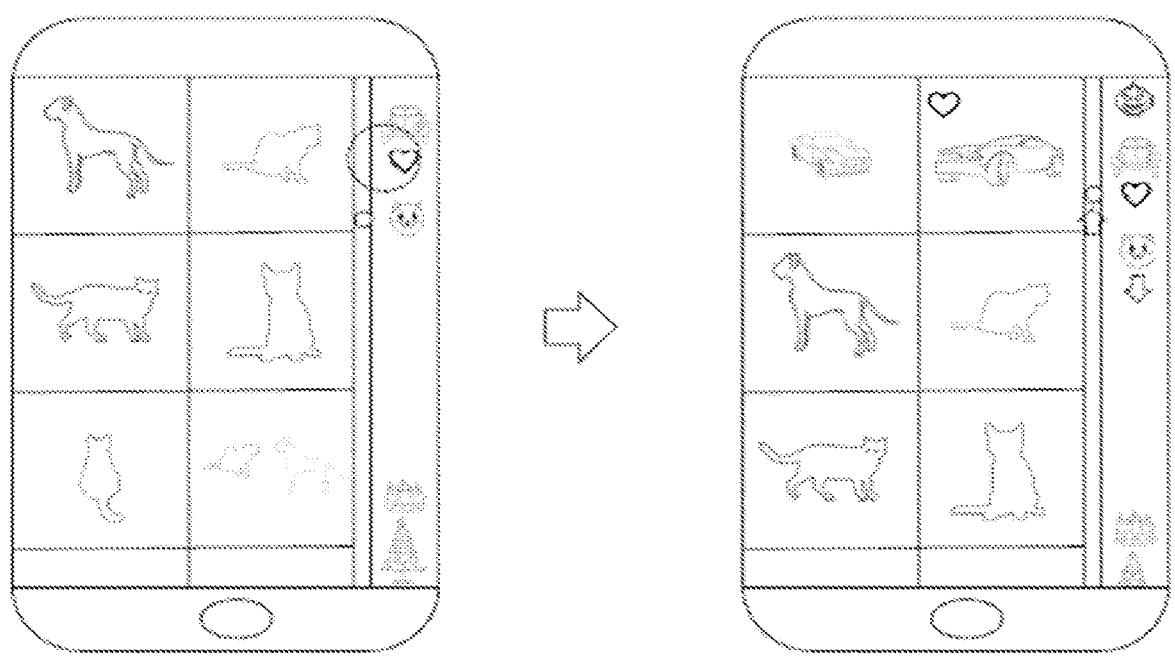
FIG. 27 represents, schematically, a user interface for a method for sharing subject of the present invention.

FIG. 27 represents another inlay in the photograph gallery of a photograph. The inlay may be achieved by inserting a heart on the navigation bar and/or on the thumbnail representing this photograph in the gallery.

Figure 28:
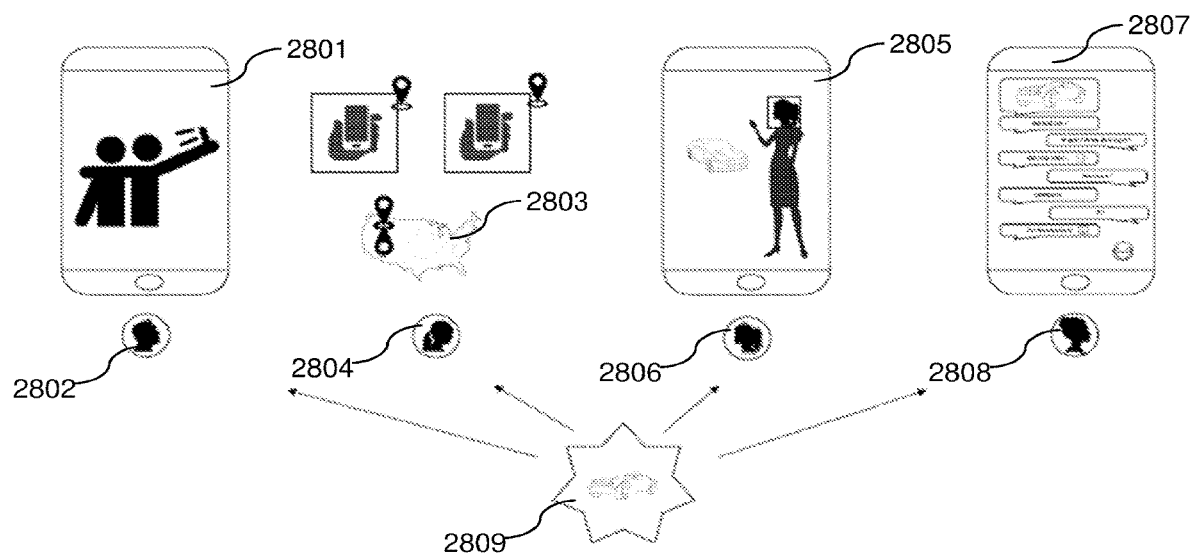
FIG. 28 represents, schematically, a first embodiment of a method for sharing subject of the present invention.

FIG. 28 represents the steps of calculating 3404 and comparing 3406 of the method for sharing 3400 subject of the present invention.

In FIG. 28, for at least one photograph 2809, each member, 2802, 2804, 2806, 2808, of a social network which the user capturing the photograph is part of, is associated with an interaction rating between the user and another member, 2802, 2804, 2806 or 2808.

In some embodiments, the step of calculating 3404 depends on the following predefined rules and scales.

In preferred embodiments, the interaction rating comprises a decreasing function of the time elapsed since the photograph was captured, an example is given bellow.

In preferred embodiments, the step of extracting 3402 comprises a step of applying 3403 a facial recognition algorithm to the photograph, and wherein the interaction rating of pairs of users wherein at least one user has been recognized is increased. For example, if the faces of the user and said other member are both recognized in the photograph and the photograph has just been taken 2801, the interaction rating is equal to 100, if the photograph is old, i.e. the time elapsed between the timestamp of the photograph and the actual date is superior to a predefined time value, 20 points are added to the interaction rating. As another example, if the face of the member 2805 is recognized in the picture, and the member 2805 and the user are not in direct social relationship, 20 points are subtracted to the interaction rating. If the face of the member is recognized in the picture the member and the photograph has just been taken, 20 points are added to the interaction rating.

In preferred embodiments, wherein each action performed by a user with regards to the photograph increases the interaction rating of pairs of users wherein one user is the user performing the action. For example, if the photograph is part of a shared album and/or cluster with the member, that is, that member took pictures at a nearby time and place and the member and the user are in direct social relationship, i.e. a connection has been established between the user profiles, or the cluster is a common cluster 604 as explained above, 20 points are added to the interaction rating. If the cluster is a shared cluster 903, 50 points are added to the interaction rating. If the member and the user have more than one degree of social relationship, i.e. the user and the member have another member in common or more members of chain in common without being directly connected, 10 points are subtracted to the interaction rating.

If the photograph is old and was shared with said member, the interaction rating is not affected. If the photograph is old and a direct social connection 2807 has been established in the meantime with this member, 30 points are added to the interaction rating.

In preferred embodiments, the method for sharing 3400 a step of calculating 3405 a social proximity between the users of a pair, the interaction rating of the pair of users depends on the social proximity calculated.

A social network can be represented by links between nodes (users). The social proximity is the number of intermediate nodes between two users.

These examples are given for illustrative purposes, but the embodiment preferably implements known techniques of clustering and machine learning, which calculate the interaction rating based on the metadata and preferences of the user and members.

In FIG. 28, member 2802 is recognized with the user on the photograph 2801. Member 2804 has taken photographs at the same geolocation 2803. Member 2806 is recognized on the user's photograph 2805. Member 2808 has interacted 2807 with the photograph.

The calculated interaction rating is compared to a first predefined value for the method for sharing 3400. If the photograph 2809 interaction rating is superior to the first predefined limit value, a step of initializing 3407 a contact between said users 2802, 2804, 2806, 2808. In preferred embodiments, the step of initializing 3407 a contact is upon validation by the first user.

Figure 29:
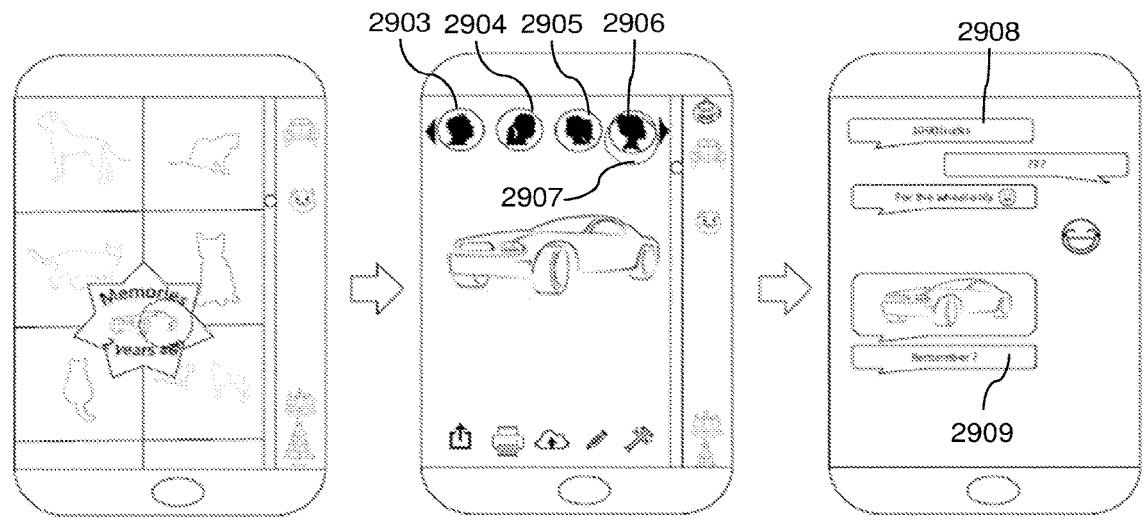
FIG. 29 represents, schematically, a step of displaying for a method for sharing subject of the present invention.

FIG. 29 represents a step of displaying according to the method for sharing subject of the present invention.

In preferred embodiments, the method 3400 comprises, a step of displaying 3408 on a terminal of the first user, an icon representing each user 2802, 2804, 2806, 2808 for which the photograph interaction rating is superior to the first predefined limit value.

In FIG. 29, four thumbnails 2903, 2904, 2905, 2906, are displayed, representing four members, 2802, 2804, 2806, 2808, for which the interaction rating is superior to the first predefined limit value. The user can select at least one thumbnail representing a member 2906 to initialize 3407 a contact, as represented by the dotted circle 2907. When the user selects another member, this selection acts as a validation by the first user to initialize contact.

In preferred embodiments, the initialized contact 3407 is a message sent to the user depending on the photograph metadata. In response to selection of a thumbnail representing a member by the user, a message is defined from the metadata of the photograph. For example, the following rules to elaborate the message can be applied:
  if the photograph is a selfie of the user and the member 2801, send the photograph by short messaging system (acronym "SMS") to this member 2801, accompanied by the comment "so cool !", for example;
  if the photograph corresponds to a shared cluster 903, according to the method for clustering subject of the present invention, in progress between the user and the member, send the photograph accompanied by the text "Tom is Taking pictures too. Do you want to share the photographs with him?", to be displayed on his camera 801 during his next photograph;
  if the member's face is recognized in the photograph 2805 and the is not in direct social link with the user, send the photograph accompanied by a proposal for direct link;
  if the photograph has already been the subject of social interaction 2807 and the relationship degree is not direct, send the photograph by resuming the thread 2807 of this interaction accompanied by the comment "remember?" 2909.

The examples set forth above are mere examples and any means of communication for initializing a contact 3407 can be implemented between the user and the member.

In preferred embodiments, the method comprises a step of applying 3409 a machine learning algorithm to elaborate the message, the machine learning algorithm being applied to at least one parameter representative of a user habit in relation to contact messages.

Figure 30:
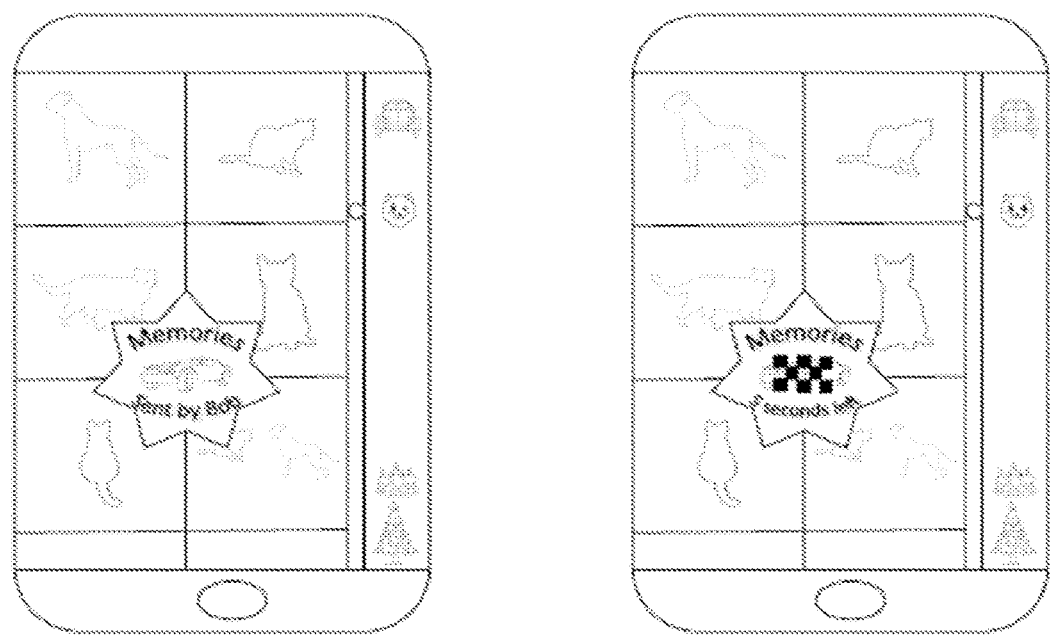
FIG. 30 represents, schematically, a user interface for a method for sharing subject of the present invention.

FIG. 30 represents another initialized communication between the user and a member.

In FIG. 30, the photograph is sent to the member as an inlay in the photograph gallery of the member, as represented in the left panel of FIG. 30, accompanied by the text "Memories sent by user". This photograph is hidden gradually, for example over a time of five seconds as represented in the right panel of FIG. 30. Such an initialized communication can be implemented if the user and the member are not in direct link on the social network.

Figure 31:
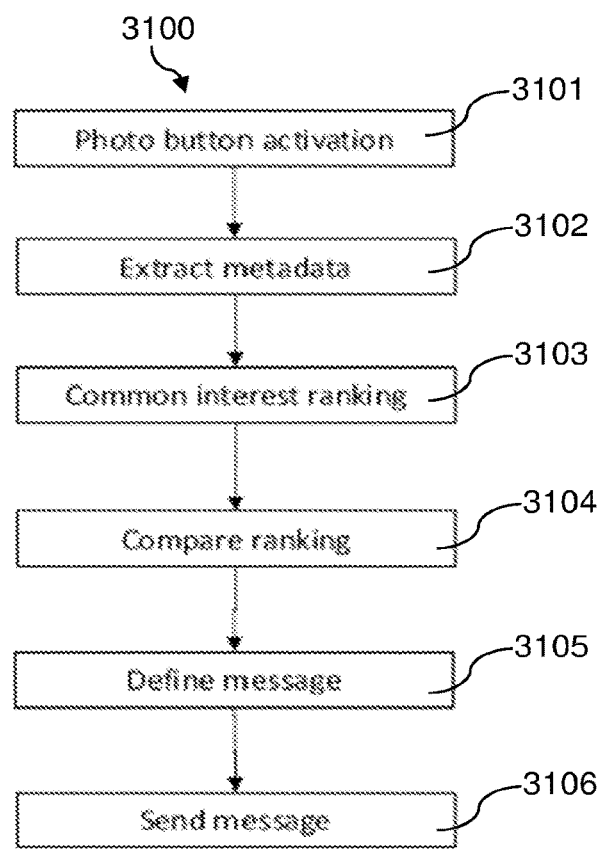
FIG. 31 represents, schematically, a second embodiment of a method for sharing subject of the present invention.

FIG. 31 represents a particular embodiment 3100 of the method for sharing represented in FIG. 34 and described with regards to FIGS. 24 to 31.

The following correspondence between step can be established:
  step 3102 corresponds to step 3402;
  step 3103 corresponds to step 3404;
  step 3104 corresponds to step 3406;
  step 3105 corresponds to steps 3407;
  step 3106 corresponds to step 3408.

Step 3101 corresponds to the launch of an application interacting with the photographs of the user on the device main interface.

The steps represented in FIG. 34 and corresponding to embodiments of the method can be performed by a device containing a camera, a memory for recording the captured photograph, computing means a screen and a man-machine interface such as a digital camera, a mobile device, a smartphone, a tablet, for example.

The method for sharing subject of the present invention can be applied to reminiscence therapies. The human-machine interfaces shown in FIGS. 26, 29 and 30 can be adapted for people with memory loss. Reminiscence therapies described by Woods B, Spector A, Jones C, Orrell M, Davies S. Reminiscence therapy for dementia (review) The Cochrane Collaboration, in The Cochrane Library, Issue 2, 2005, is available to some patients with Alzheimer's disease or related syndromes. Said Therapies consist mostly of group sessions where the re-emergence of memories that was thought to have been forgotten is sought. These sessions can use photographs to provide clues to facilitate the recovery of memories from the distant past.

For the comfort of the patient, the therapist can have, on a patient's device, a specific man-machine interface and give indications of keywords to prefer, such as holidays, smiles, family, or to avoid, such as city, period of life, so that the chosen photographs evoke positive, integrative, or evasive, rather than negative or obsessive memories.

For the follow-up of the patient, the therapist can have access to a summary of the patient's interactions following each photograph presentation. Said summary can be provided automatically by the method for sharing subject of the present invention to inform or at least assist the therapist in informing the autobiographical reminiscence program (Conway et al. model (2004), a standardized evaluation tool for autobiographical memory (TEMPau, Piolino, Desgranges, & Eustache, 2000)).

It is clinically observed that patients with memory disorders are better cared for through the use of autobiographical memories. However, giving a set of photograph memories to a patient may be counterproductive. The patient can get bored if the pictures are not evocative, and memories can be negative.

The present embodiment makes it possible to select the photographs according to the social interactions recorded around these photographs and parameters defined by the therapist.

In other embodiments, the present method for sharing can be applied regarding company identity. Just as countries cultivate their "national novels", a company's identity is told through a succession of memories. Said identity is necessary to put the company's action in perspective and illustrate the company's purpose. The company identity is generally recalled in order to give context to an emblematic project or to communicate with its employees, customers or the public.

However, these communication operations may require prior archiving, sorting and intense selection of millions of photographs. It is difficult to answer the questions "what are our best achievements? "What were the most difficult periods?", "what are the days when we got scared? "What are we most proud of?».

With reference to FIG. 28, users can share photographs in a professional context, the user 2809 can be a company. Notes of common interest are an indicator of a company's cluster. By weighting them with the number of people associated at a given time, these notes make it possible to trace the company's memory in a measurable way.

With reference to FIG. 3, applied in a professional environment, intelligent vision and object detection create metadata of objects {viaduct, building, reception, reception, cake, Jim, Jim, Anna, Ron, Steve}, context {outside, smile}, themes {speeches, construction site, journalists}, etc. This metadata documents the company's memory.

The graph of company clusters facilitates the aggregation of company clusters represented by clusters. For example, clusters can be the history of the company since the origin or in the last few years, projects, milestones, work environment.

With reference to FIGS. 24 and 25, photographs are not the only markers of shared clusters 903. The method can thus be applied to videos, emails, posts, comments and any shareable media. By transposing these media to the context, the traces of use can be a selection from a list, a sharing in a network, a comment, an emoji, a like, a document printing, an edition, a modification, the nature of the words or expressions used, the speed of interaction, the virality, the reputation, etc.

Intense documentary work is needed to find traces of the company's memory. Thanks to interaction ratings, the method for sharing subject of the present invention draws up an objective list of the company's memories. In additional embodiments, to prepare for the merger of two companies, bringing together two documented company memories makes it easier to identify points of convergence, resemblance and divergence.

Human Resources Departments want to energize teams, retain employees, recognize and value individual roles. However, they are poorly equipped to measure and objectify dynamism, the level of adherence, the intensity of social relations, the degree of involvement, etc.

In some embodiments, the method for sharing comprises a step of elaborating a graph of company clusters, which makes it possible to measure in different ways the level of adherence, participation and contribution of individuals at that moment, which instruments the action of the human resources department.

In the methods described above, the metadata extracting is preferably code-optimized to save device energy. The execution of the algorithms for detection of faces or objects on a photograph is thus performed as soon as this photograph has been taken, if the computing resource is available, to limit subsequent access to the hard disk, which consumes energy.

Other code optimization techniques to save energy are described by Frédéric Parain, Michel Banâtre, Gilbert Cabillic, Teresa Higuera, Valérie Issarny, et al. Techniques to reduce consumption in real-time embedded systems. Research Report] RR-3932, INRIA. 2000. ffinria-00072720.

The invention claimed is:

1. Method for clustering at least two groups of photographs, wherein at least two users are each identified by a unique identifier, the unique identifiers of said users being associated in at least one memory, each user having at least two photographs, the method comprising:
for each user:
a step of capturing at least two photographs;
a step of assigning, to each captured photograph, at least one metadata defined by a type;
a step of comparing the metadata assigned to each photograph to determine at least one discriminant type;
a step of grouping at least two photographs by discriminant type of metadata to form one or more groups;
a step of comparing the number of photographs in each of the groups to a first predefined limit value, wherein, if the number of photographs in the group is superior to the first predefined limit value, a step of clustering the photographs of the group is performed to form a cluster including one or more groups,
then, for at least one user:
a step of determining a degree of similarity of a cluster of photographs from one of the users to a cluster of photographs from another of the users depending on metadata of photographs within said clusters;
a step of comparing the degree of similarity to a second predefined limit value;
if the degree of similarity is superior to the second predefined limit value, a step of defining a common cluster among the users containing the photographs of said clusters and displaying a message indicating that a common cluster has been defined.

2. A method according to claim 1, during the step of assigning, a timestamp metadata corresponding to the moment the photograph was captured is assigned to at least one photograph, the step of grouping comprising:
a step of calculating the interval of time between two photographs depending on the assigned timestamps;
a step of comparing the calculated interval of time to a third predefined limit value; if the calculated interval is inferior to the third predefined limit value, the photographs are grouped.

3. Method according to claim 2 comprising for at least one user, a step of extracting at least one feature representative of a photograph and a step of attributing a metadata to the photograph for at least one extracted feature, and a step of adapting the second predefined limit value depending on at least one extracted feature representative of a photograph.

4. Method according to claim 2 comprising for at least one user, a step of extracting at least one feature representative of a photograph and a step of attributing a metadata to the photograph for at least one extracted feature, and a step of defining a timeframe, a step of comparing the timestamp of photographs in a cluster to the defined timeframe and a step of chaining clusters depending on metadata attributed to photographs in a cluster if the timestamp of all of the photographs in a cluster are within the defined timeframe.

5. Method according to claim 1, wherein during the step of assigning, a geolocation metadata corresponding to the location where the photograph was captured is assigned to each captured photograph; the step of grouping further comprising:
 a step of determining a distance between two photographs depending on the assigned geolocations; and
 a step of comparing the distance to a third predefined limit value, if the calculated interval is inferior to the first predefined limit value and if the determined distance is inferior to the third predefined limit value, the photographs are grouped.

6. Method according to claim 5, further comprising a step of associating a geolocation to a cluster depending on the assigned geolocations of the photograph in the cluster.

7. Method according to claim 5, comprising a step of defining an origin based on geolocation coordinates and a step of adapting the third predefined limit value depending on the distance between the geolocation of a photograph and the origin.

8. Method according to claim 1, further comprising, for at least one user, a step of extracting at least one feature representative of a photograph and a step of attributing a metadata to the photograph for at least one extracted feature.

9. Method according to claim 8, comprising a step of dividing a cluster into at least two sub-clusters depending on metadata attributed to photographs in a cluster and corresponding to an extracted feature.

10. Method according to claim 1, further comprising, for at least one user, a step of importing an event characterized by event metadata, a step of associating an event to at least one cluster or sub-cluster depending on metadata of photographs in said cluster or sub-cluster and on the event metadata.

11. Method according to claim 10, wherein an event metadata comprises a geolocation and a timeframe, the method comprising a step of excluding a photograph from a cluster associated with an event if the geolocation and timestamp of said photograph fails to correspond to the geolocation and timeframe of the event metadata.

12. Method according to claim 1, comprising, for at least one user, a step of applying a machine learning algorithm configured to modify at least one predefined limit value, the machine learning algorithm being applied to at least one parameter representative of a user habit in relation to said predefined limit value.

13. Method according to claim 1, further comprising, for at least one user, a step of reallotting at least one photograph from one cluster to another.

14. Method according to claim 1, wherein the step of defining a common cluster comprises a step of sharing said common cluster between the users after validation by at least one user.

15. Method according to claim 1, further comprising a step of displaying at least one common cluster in the form of a graph depending on the metadata of the photographs in the common cluster and on the identified users sharing said common cluster.

16. Method according to claim 1, further comprising, for at least one user, a step of automatically naming at least one folder depending on metadata of the photographs in a cluster and a step of displaying the folders containing the photographs of the corresponding cluster.

17. Method according to claim 1, wherein each unique identifier comprises user metadata, one user having a cluster of photographs, the method further comprising a step of comparing user metadata representing another user to the photograph metadata within said cluster and, depending on the results of the comparison, a step of associating the another user to said cluster.

18. Method according to claim 1, wherein, for at least one user, the step of grouping is iterated when at least one additional photograph has been captured.

* * * * *